(12) United States Patent
Grigoryev et al.

(10) Patent No.: US 8,984,432 B2
(45) Date of Patent: Mar. 17, 2015

(54) METHOD FOR DISPLAYING PAGE SHAPE AND DISPLAY APPARATUS THEREOF

(71) Applicant: Samsung Electronics Co., Ltd., Gyeonggi-do (KR)

(72) Inventors: Andrey Grigoryev, Khartsyzk (UA); Yevgen Yakishyn, Kyiv (UA); Andrey Pepelyaev, Boryspil (UA); Oleksandr Voloshko, Kyiv (UA)

(73) Assignee: Samsung Electronics Co., Ltd (KR)

( * ) Notice: Subject to any disclaimer, the term of this patent is extended or adjusted under 35 U.S.C. 154(b) by 268 days.

(21) Appl. No.: 13/720,494

(22) Filed: Dec. 19, 2012

(65) Prior Publication Data

US 2013/0159914 A1    Jun. 20, 2013

Related U.S. Application Data

(60) Provisional application No. 61/577,453, filed on Dec. 19, 2011.

(30) Foreign Application Priority Data

Sep. 13, 2012 (KR) .................. 10-2012-0101363

(51) Int. Cl.
  *G06F 3/048* (2013.01)
  *G06F 3/0483* (2013.01)
  *G06F 3/0488* (2013.01)
(52) U.S. Cl.
  CPC ............ *G06F 3/0483* (2013.01); *G06F 3/0488* (2013.01); *G06F 2203/04808* (2013.01)
  USPC ...................................... 715/776
(58) Field of Classification Search
  CPC ................ G06F 3/0483; G06F 3/0488; G06F 2203/04808

USPC .................................................. 715/776, 786
See application file for complete search history.

(56) References Cited

U.S. PATENT DOCUMENTS

| 5,053,762 | A | 10/1991 | Sarra |
| 5,233,332 | A | 8/1993 | Watanabe et al. |
| 5,463,725 | A | 10/1995 | Henckel et al. |
| 7,139,982 | B2 | 11/2006 | Card et al. |
| 7,171,630 | B2 * | 1/2007 | O'Leary et al. ............... 715/856 |
| 7,315,312 | B2 | 1/2008 | Hemmings |
| 7,898,541 | B2 | 3/2011 | Hong et al. |
| 2003/0117425 | A1 * | 6/2003 | O'Leary et al. ............... 345/700 |
| 2010/0175018 | A1 * | 7/2010 | Petschnigg et al. ........... 715/776 |
| 2011/0296334 | A1 | 12/2011 | Ryu et al. |
| 2012/0084702 | A1 * | 4/2012 | Lee et al. ...................... 715/776 |
| 2013/0159914 | A1 * | 6/2013 | Grigoryev et al. ............ 715/776 |
| 2013/0198678 | A1 * | 8/2013 | Lee et al. ...................... 715/776 |
| 2013/0222416 | A1 * | 8/2013 | Kim et al. ..................... 345/619 |
| 2013/0232439 | A1 * | 9/2013 | Lee et al. ...................... 715/776 |
| 2013/0298068 | A1 * | 11/2013 | Lee et al. ...................... 715/776 |
| 2014/0152597 | A1 * | 6/2014 | Lee ............................... 345/173 |

FOREIGN PATENT DOCUMENTS

| EP | 2 390 773 | 11/2011 |
| JP | 2000163193 | 6/2000 |
| KR | 1020040087425 | 10/2004 |
| KR | 1020070100544 | 10/2007 |
| KR | 20100008696 | 1/2010 |
| KR | 1020110130956 | 12/2011 |

* cited by examiner

*Primary Examiner* — David Phantana Angkool
(74) *Attorney, Agent, or Firm* — The Farrell Law Firm, P.C.

(57) ABSTRACT

A method for displaying page shape includes displaying a page screen, detecting at least one touch starting point by a first user-manipulation on the page screen, detecting at least one dragging direction by a second user-manipulation made consecutively to the first user-manipulation, and dimensionally deforming the page screen based on the touch starting point and the dragging direction and displaying the deformed page screen.

17 Claims, 31 Drawing Sheets

FIG. 13
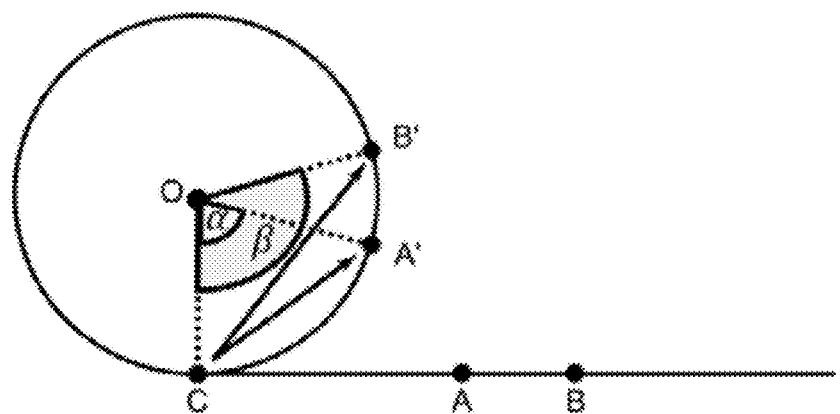
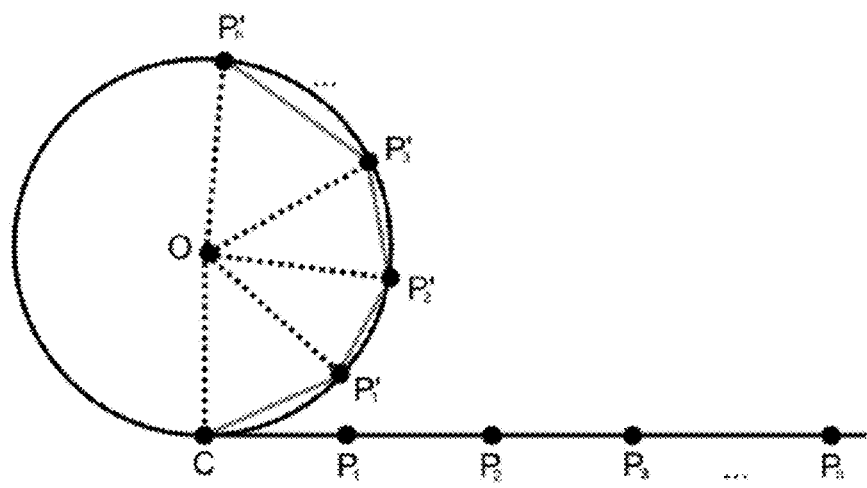

METHOD FOR DISPLAYING PAGE SHAPE AND DISPLAY APPARATUS THEREOF

PRIORITY

This application claims priority under 35 U.S.C. §119(e) to U.S. Provisional Patent Application No. 61/577,453, filed on Dec. 19, 2011, in the United States Patents and Trademark Office, and under 35 U.S.C. §119(a) to a Korean Patent Application No. 10-2012-0101363, filed on Sep. 13, 2012, in the Korean Intellectual Property Office, the disclosure of which each of which is incorporated herein by reference in its entirety.

BACKGROUND OF THE INVENTION

1. Field of the Invention

The present invention relates generally to displaying a page shape, and more specifically, to a method and apparatus for simulating the page shape of an electronic book and displaying the simulated page shape.

2. Description of the Related Art

Generally, an electronic book is a digital book in which the information such as texts or graphics are recorded and utilized as a book.

An important aspect of an electronic book is displaying the page of the electronic book to provide a better user experience is implemented. However, conventional methods for displaying the page of the electronic book are problematic due to the unrealistic effects when turning a page over, and the conventional methods are limited by providing a user experience similar to that of reading the paper book.

SUMMARY OF THE INVENTION

Accordingly, the present invention has been made in view of the above problems and/or disadvantages, and the present invention provides a method and apparatus for realistically displaying a page shape when turning the page over, similar to a user experience utilizing the paper book.

An aspect of the present invention is to provide a method for displaying a page shape, which includes displaying a page screen, detecting at least one touch starting point by a first user manipulation on the page screen, detecting at least one dragging direction by a second user manipulation made consecutively to the first user manipulation, and dimensionally deforming the page screen based on the touch starting point and the dragging direction and displaying the deformed page screen, resulting from dimensionally deforming the page screen.

Another aspect of the present invention is to provide a display apparatus, which includes a display configured to display a page screen, a detector configured to detect at least one touch starting point by a first user manipulation on the page screen and at least one dragging direction by a second user manipulation consecutively made to the first user manipulation, and a controller configured to dimensionally deform the page screen based on the touch starting point and the dragging direction and display the deformed page screen, resulting from dimensionally deforming the page screen.

BRIEF DESCRIPTION OF THE DRAWINGS

The above and/or other aspects, features and advantages of the present invention will be more apparent from the following detailed description taken in conjunction with the accompanying drawings, in which:

FIG. 13 is a diagram illustrating the mathematical model of the geometry algorithms on the three dimensions, according to an embodiment of the present invention;

DETAILED DESCRIPTION OF THE EMBODIMENTS OF THE PRESENT INVENTION

Figure 1:
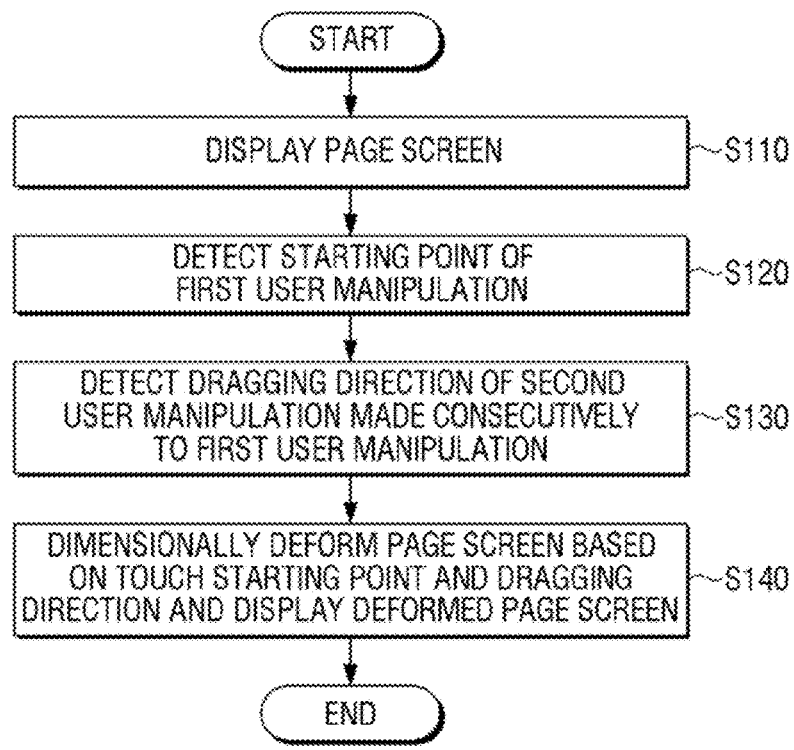
FIG. 1 is a flowchart illustrating a method of displaying the page shape, according to an embodiment of the present invention.

Various embodiments of the present invention are described in detail with reference to the accompanying drawings. In the following description, same drawing reference numerals are used for the same elements throughout the drawings. The matters defined in the description, such as detailed construction and elements, are provided to assist in a comprehensive understanding of the present invention. Detailed description of well-known functions or constructions is omitted to avoid obscuring the subject matter of the present invention with unnecessary detail.

A method of displaying the page shape according with reference to the drawings is described below.

The page shape is classified as a static situation and an animation situation. The static situation refers to that the page is already deformed or has the regular form without movement. Specifically, the page shape is the shape at the moment when the finger touches the page. The animation situation refers to when the page shape deforms according to the time trends. Specifically, the animation situation is the page shape at the moment when a finger is removing from the page or for the consecutive moments after removing.

FIG. 1 is a flowchart illustrating the method of displaying the page shape according to an embodiment of the present invention.

Referring to FIG. 1, the method of displaying the page shape includes displaying the page screen, in Step S110, detecting the starting point of a first user manipulation, in Step S120, detecting the dragging direction of a second user manipulation, in Step S130, and deforming the page screen and displaying the result, in Step S140.

The page screen of the electronic book is displayed on the display screen, in Step S110. The display screen refers to the display of the electronic apparatus that can show the image. The electronic apparatus is implemented as every type of the display apparatus such as the Television (TV), the cellular phone, the Personal Digital Assistant (PDA), the note book, the Personal Computer (PC), the monitor, the tablet PC, the electronic book, the electronic frame, the kiosk, the flexible display, or the Head Mounted Display (HMD). The user may read the characters of the page or watch the pictures, turn the page over as if he or she is using a paper book, and find the information on another page.

In Step S120 of detecting the starting point of the first user manipulation detects the starting point of at least one touch by the first user manipulation on the page screen.

The first user manipulation refers to touching one point of the display screen on the displaying page according to user experience to deform the page likewise the paper book. The starting point of at least one touch by the first user manipulation is detected.

Detecting the touch starting point is implemented by the touch sensor (not illustrated). Well-known various touch sensing technologies such as the capacitive or resistive type is utilized.

In Step S130 of detecting, the dragging direction by the second user manipulation detects at least one dragging direction by the second user manipulation consecutive to the first user manipulation. The second user manipulation refers to the manipulation to input the dragging toward the predetermined direction consecutively while keeping touching by the first user manipulation. The touch sensor (not illustrated) detects at least one dragging direction by the second user manipulation.

If the dragging direction of the second user manipulation is detected, the page screen is deformed dimensionally based on the touch starting point and the dragging direction and the displaying is implemented, in Step S140.

The single finger mode for turning the page over with one finger, in other words, by inputting one touch point, and the multi finger mode for turning the page over with two fingers, in other words, by inputting two touch points, as described below.

Figure 2:
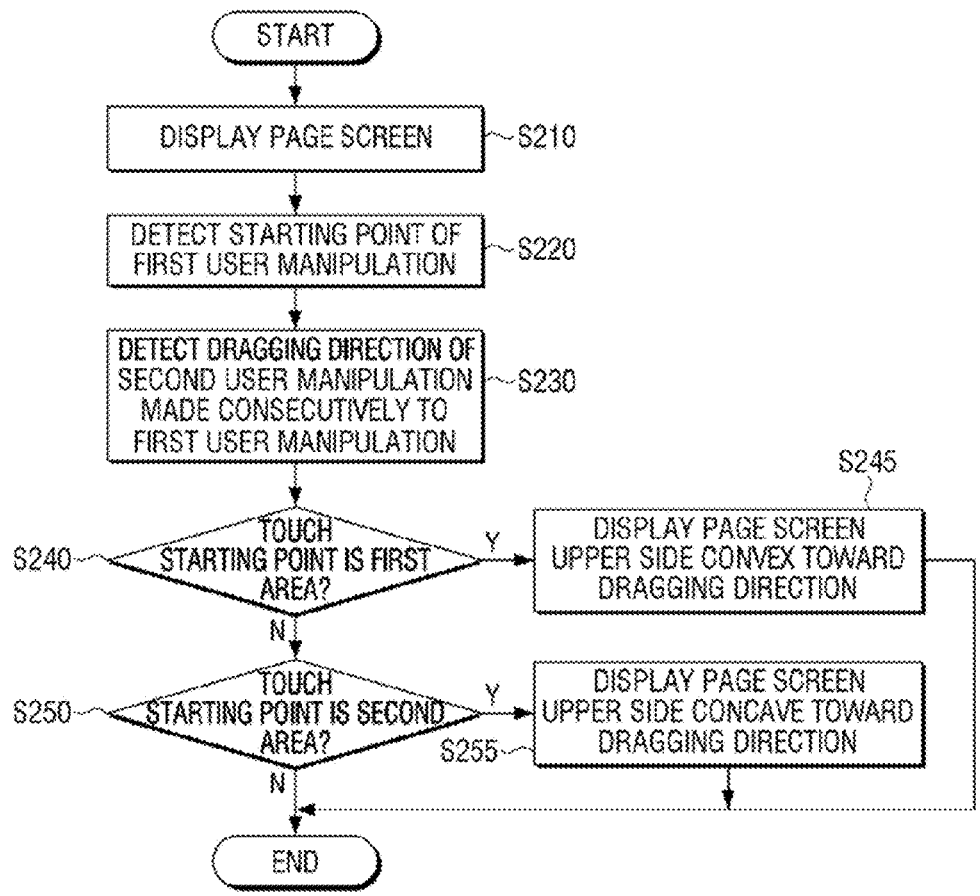
FIG. 2 is a flowchart illustrating a method of displaying the page shape, according to an embodiment of the present invention.
Figure 3:
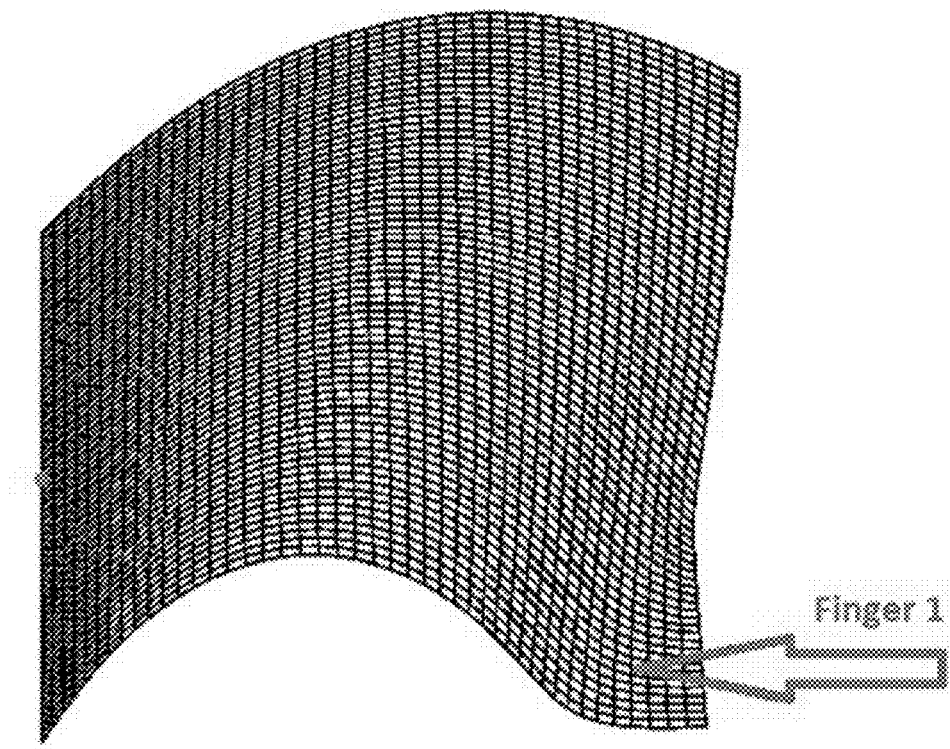
FIGS. 3 and 4 are diagrams illustrating the page shape according to FIG. 2 according to an embodiment of the present invention.
Figure 4:
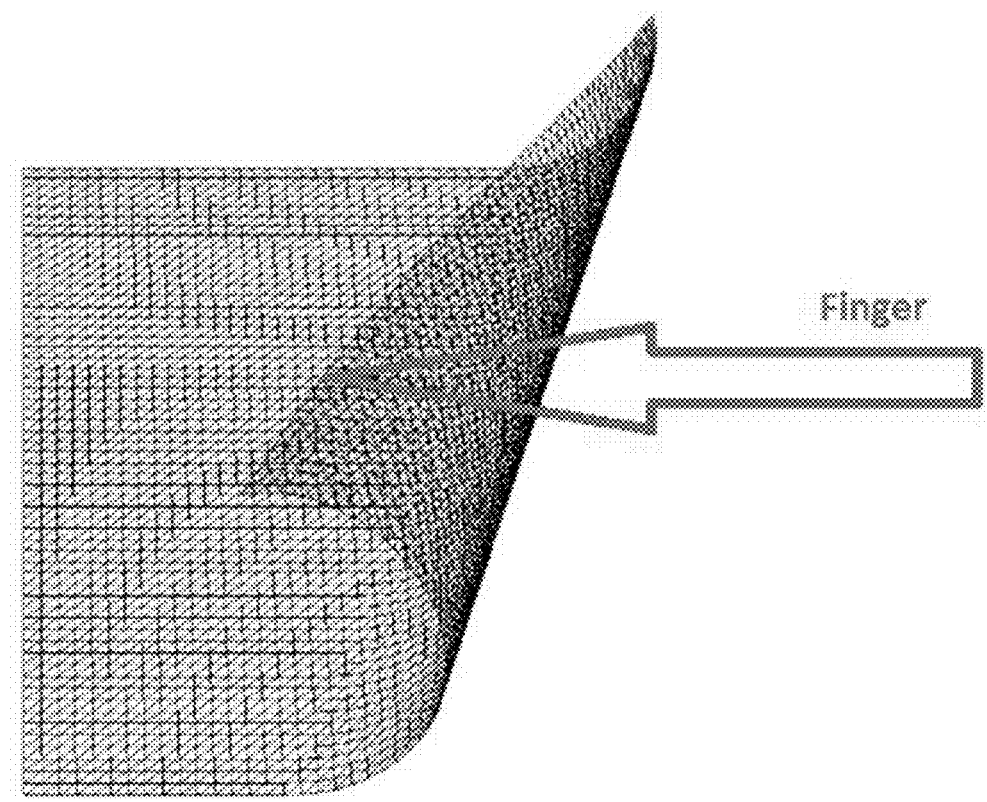
Figure 5:
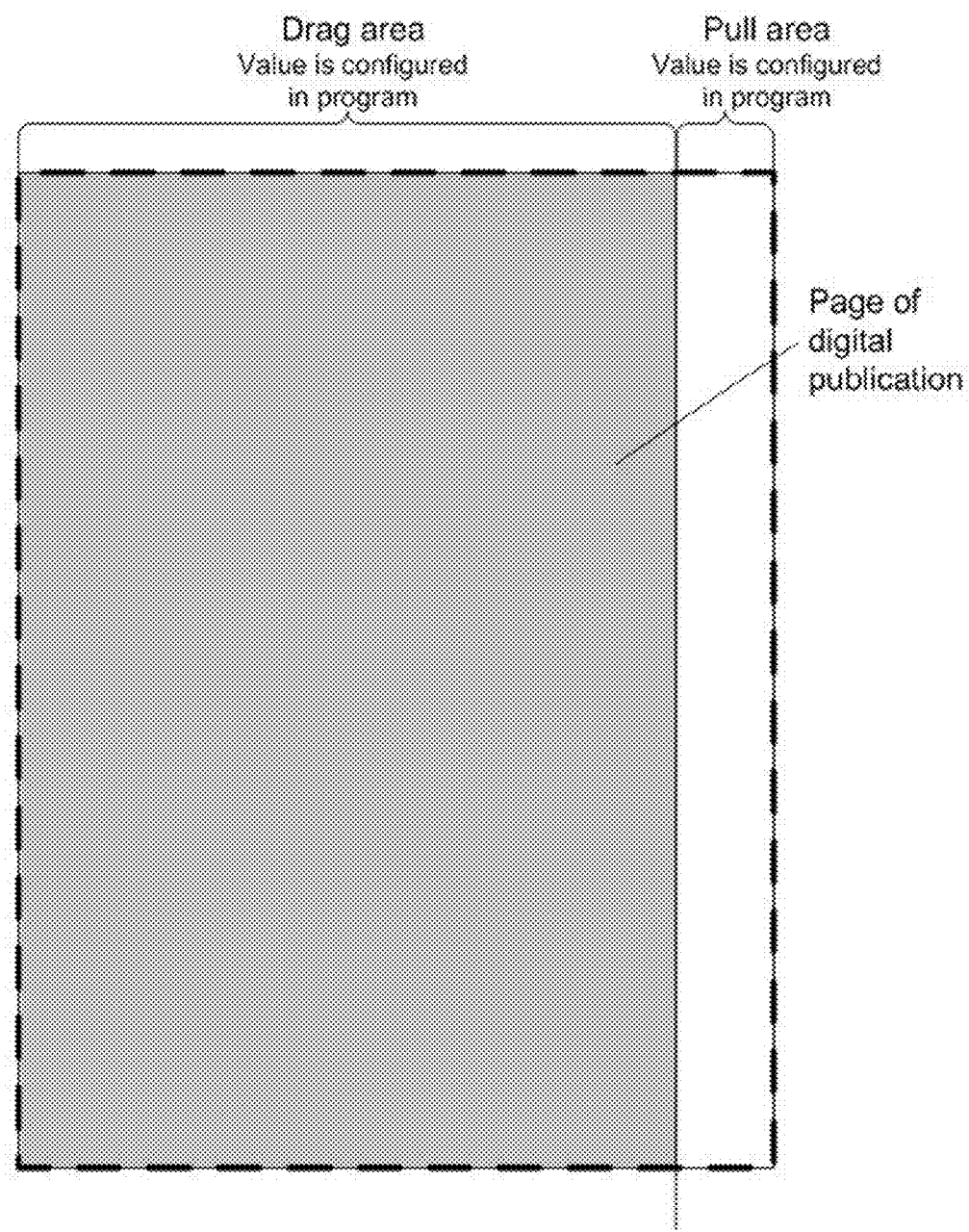
FIG. 5 is the pull area and the dragging area of the page according to an embodiment of the present invention.

FIG. 2 is a flowchart illustrating the method of displaying the page shape according to an embodiment, FIGS. 3 and 4 are the page shape of FIG. 2, and FIG. 5 is a diagram illustrating the pull area and the dragging area of the page.

Referring to FIG. 2, the method of displaying the page shape according to an embodiment includes displaying the page screen, in Step S210, detecting the starting point of the first user manipulation, in Step S220, and detecting the dragging direction of the second user manipulation, in Step S230. The operations, in Steps S210, S220 and S230 are the same as the operations explained above with regard to Steps S110, S120 and S130.

In Step S110 of deforming the page screen dimensionally may display the page screen having the convex upper side, in Step S245 if the touch starting point is detected in the first area of the page screen, in Step S240-Y, and display the page screen having the concave upper side, in Step S255 if the touch starting point is detected in the second area of the page screen, in Step S250-Y.

When turning the page over, the user manipulation includes rubbing and pushing the page with one finger to turn the page over. If the user pushes the page while putting the finger on the book page, the page may deform toward the pushing direction.

If the direction to push the page is opposite to the hinge of the paper book, the page shape may not deform. However, if the direction to push the page is toward the paper book hinge, the page may deform in the convex upper side. In Step S245 may simulate the user experience. Referring to FIG. 3, if the touch starting point is detected on the predetermined area of the page screen, and the dragging is inputted consecutively, the page screen is displayed in the convex upper side toward the dragging direction.

When utilizing the paper book, if the finger pushes the page near the edge or the side of the page, the page side is rubbed with the finger and the upper side of the page is concave. In Step S255 may simulate the user experience. Referring to FIG. 4, if the user starting point is detected on another predetermined area and the dragging is inputted consecutively, the page screen is displayed in the concave upper side toward the dragging direction.

The first area and the second area are defined in the display screen as in FIG. 5.

Referring to FIG. 5, the first area is referred to as drag area, and the second area is referred to as pull area. In reality, the paper book may have a narrower pull area compared to FIG. 5, and the finger touching area is the side or the edge of the paper book page. However, considering the user convenience, the electronic book may define then second area to be the determined area near the page side and provide the user experience.

The drag area in the embodiment of FIG. 5 is defined as the page area of the electronic book positioned within the predetermined distance from the hinge, in other words, the axis of the electronic book. The pull area is defined as the page area of the electronic book positioned within the predetermined distance from the side of the electronic book page. The drag area and the pull area may not overlap in the embodiment of FIG. 5.

If the starting point of the user touch is detected in the drag area and the dragging is inputted consecutively, the page is deformed and displayed while the upper side of the page is convex toward the dragging direction by referring to FIG. 3.

If the starting point of the user touch is detected in the pull area and the dragging is inputted consecutively, the page is deformed and displayed while the upper side of the page is concave toward the dragging direction by referring to FIG. 4.

If the touch is detected both in the pull area and drag area, the range of detecting the touch is broader.

Further, according to an embodiment, if the page dragging is inputted in the other direction than the horizontal dragging direction, the vector factors of the orthogonal and horizontal directions is considered. By considering the page deformation toward the orthogonal direction of dragging the page and the page deformation toward the horizontal direction of dragging the page, the page shape is displayed.

When turning the paper book page over, the page shape is deformed differently according to the position of rubbing the page and direction of pushing the page. For instance, if the finger touches the paper book page on the center of the page and pushes the page toward the hinge of the page, the page is deformed in the convex upper side. The curvature of radius of the page cross section from the upper to the lower direction is determined. If the finger touches the upper area or the lower area of the page and pushes the page toward the hinge, the curvature of radius of the page cross section is deformed. If the finger touches the upper area of the page and pushes the page toward the hinge, the page shape is deformed in the form wherein the curvature of radius of the page cross section may increase from the upper to the lower direction. If the finger touches the lower area of the page and pushes the page toward the hinge, the page is deformed in the form wherein the curvature of the radius of the page cross section decreases from the upper to the lower direction. As a result, according to the page touching area, the deformation of the page shape varies.

Figure 6:
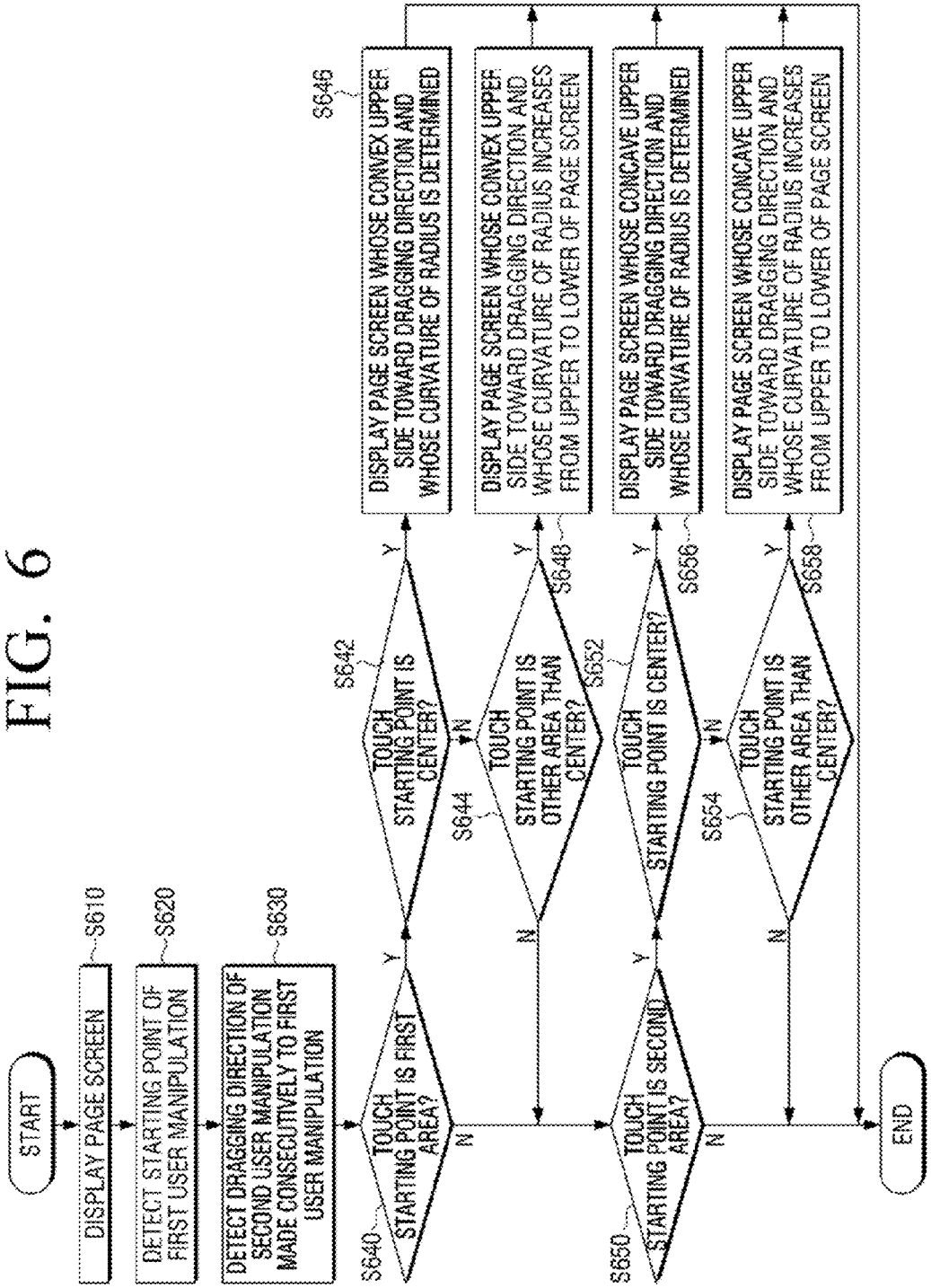
FIG. 6 is a flowchart illustrating a method of displaying the page shape to simulate the page motion previously described according to an embodiment of the present invention.
Figure 7:
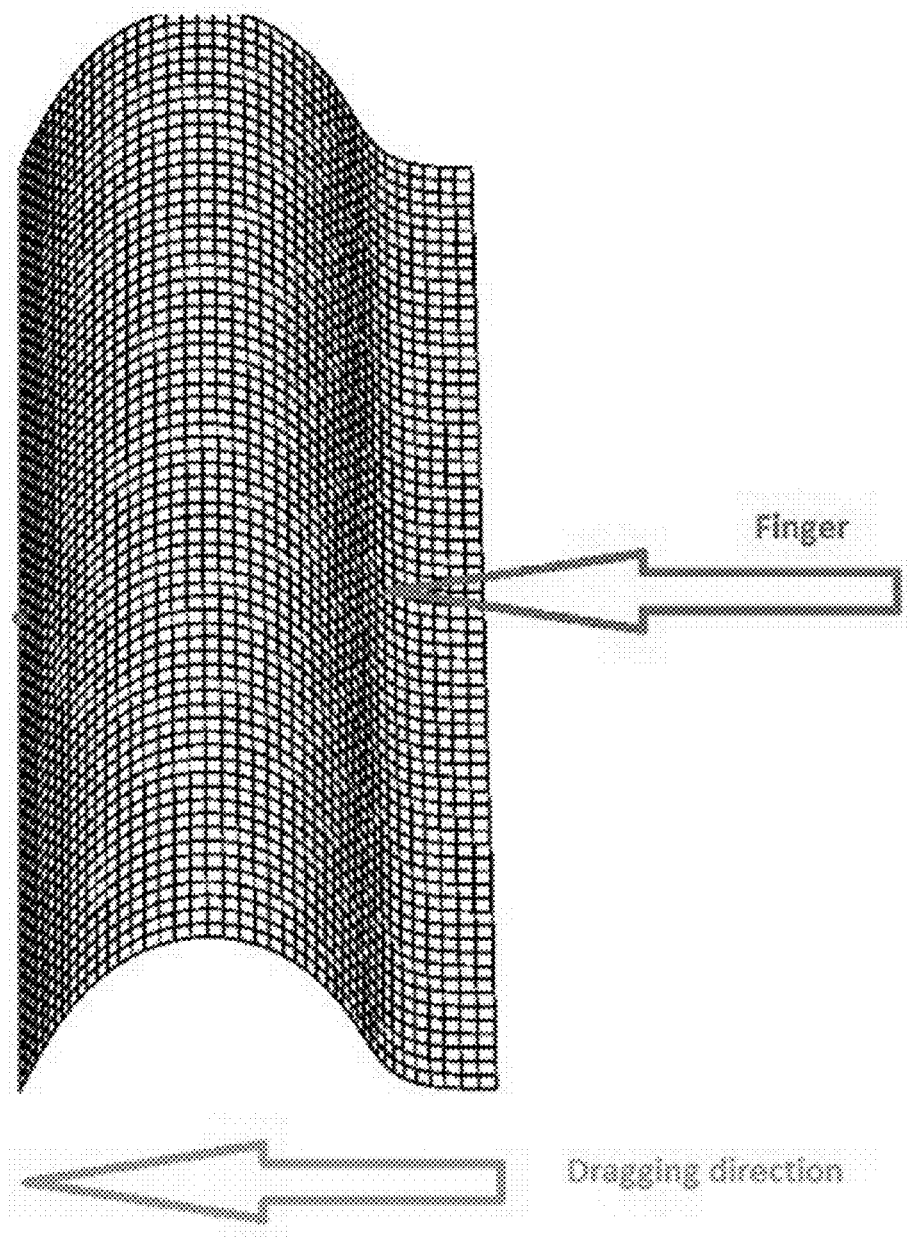
FIGS. 7 and 8 are diagrams illustrating the page shape displayed according to the method of FIG. 6, according to an embodiment of the present invention.
Figure 8:
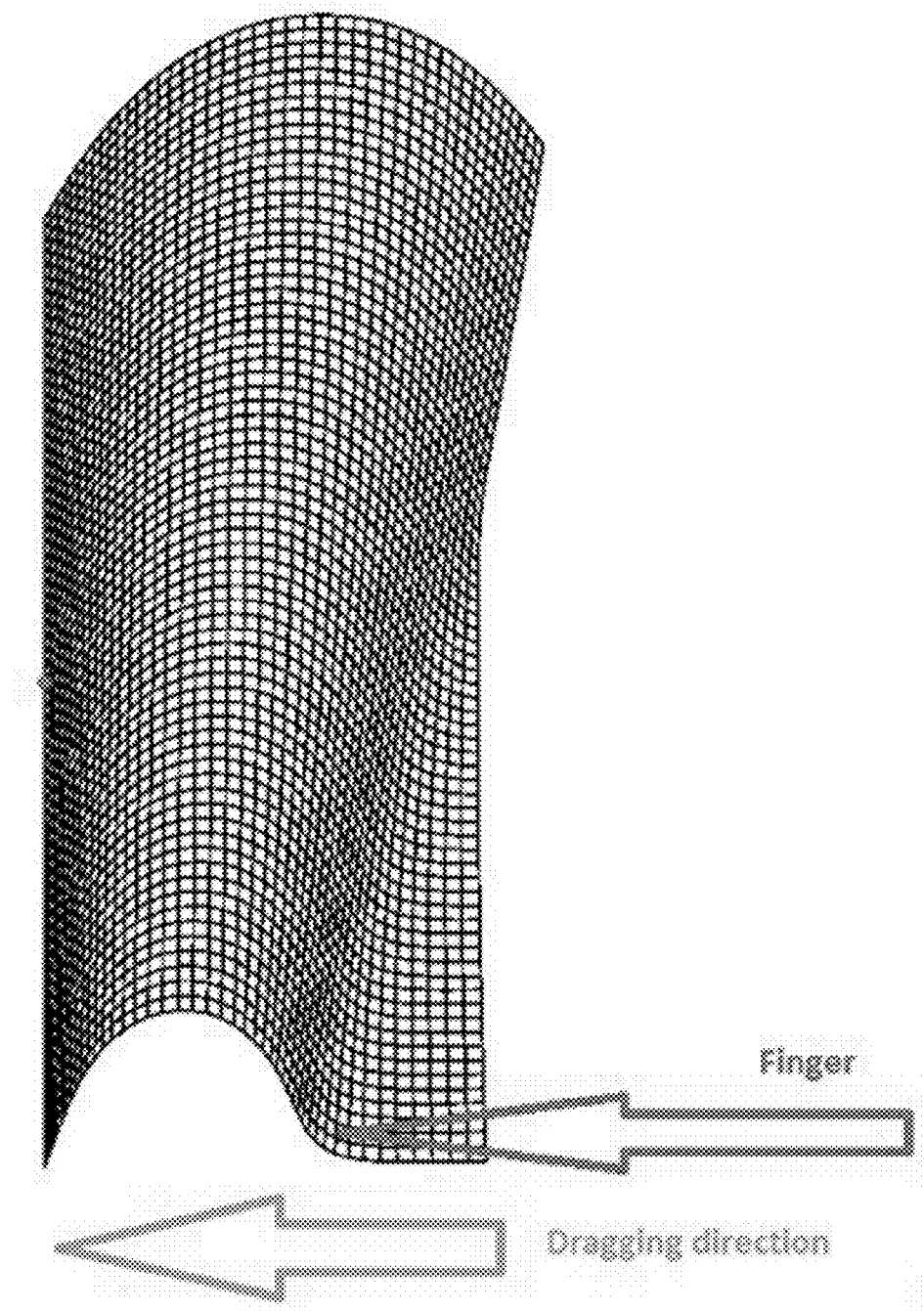

FIG. 6 is a flowchart illustrating a method of displaying the page shape to simulate the previously described page motion according to an embodiment, and FIGS. 7 and 8 illustrate the page shape to be displayed by the method of FIG. 6.

Referring to FIG. 6, the method of displaying the page shape according to an embodiment includes displaying the page screen, in Step S610, detecting the starting point of the first user manipulation, in Step S620, and detecting the dragging direction of the second user manipulation, in Step S630. The operations of Steps S610, S620, and S630 are the same as the operations described above with regard to Steps S110, S120 and S130.

If the touch starting point is positioned at the center of any one of the first area or the second area on the page screen, in Step S640-Y and S642-Y, the method of displaying the page shape further includes Step S646 of displaying the page screen in the form having the determined curvature of radius of the page cross section.

Further, if the touch starting point is positioned on an area other than the center of any one of the first and second areas on the page screen, in Step S640-Y and S644-Y, the method of displaying the page shape further includes Step S648 of displaying the page screen in the form having the increasing curvature of radius of the page cross section from the touch starting point to the center.

According to the above embodiment, Referring to FIG. 7, if the touch starting point is positioned at the center of any one of the first and second areas on the page screen and the dragging of the second user manipulation is implemented toward the hinge consecutively, the page shape is convex with the determined curvature of radius.

However, referring to FIG. 8, if the touch starting point is positioned on an area other than the center of any one of the first and second areas on the page screen and the dragging of the second user manipulation is implemented toward the hinge consecutively, the page shape is concave with the increasing curvature of radius from the touch starting point of the page to the center. The page shape is deformed in the conic form.

The mathematical model of the above single finger mode is described below. The above page shape can be displayed with the following mathematical model, but is not limited thereto.

Figure 9:
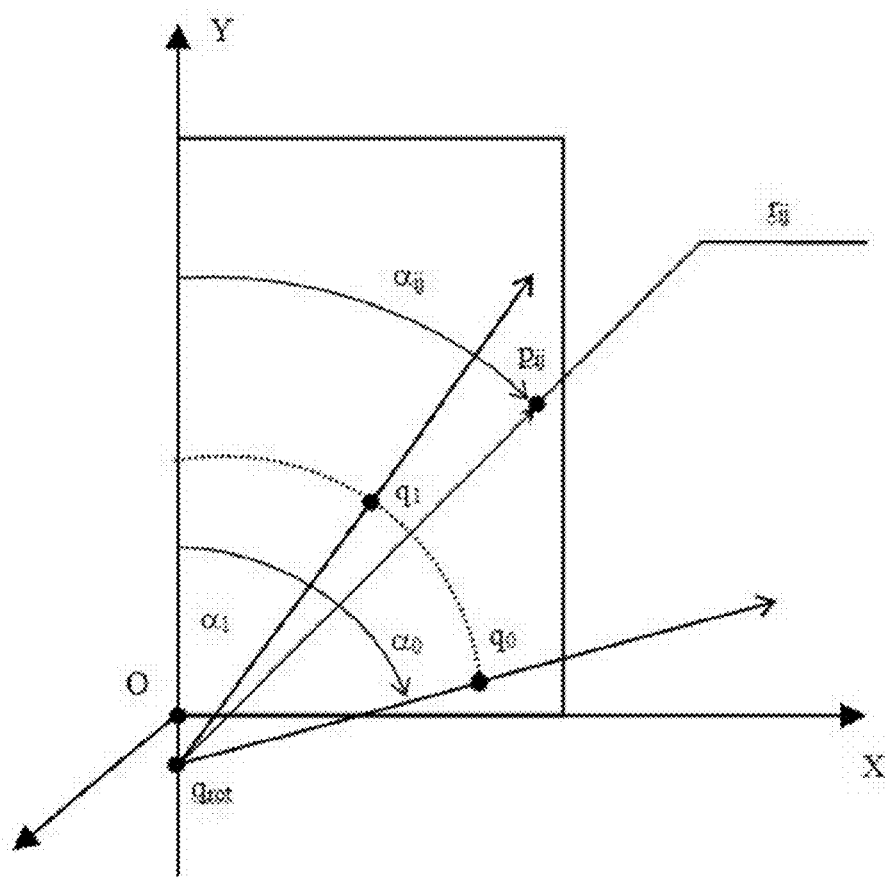
FIGS. 9 and 10 are diagrams illustrating dimensional coordinates for explaining the single finger mode according to an embodiment of the present invention.
Figure 10:
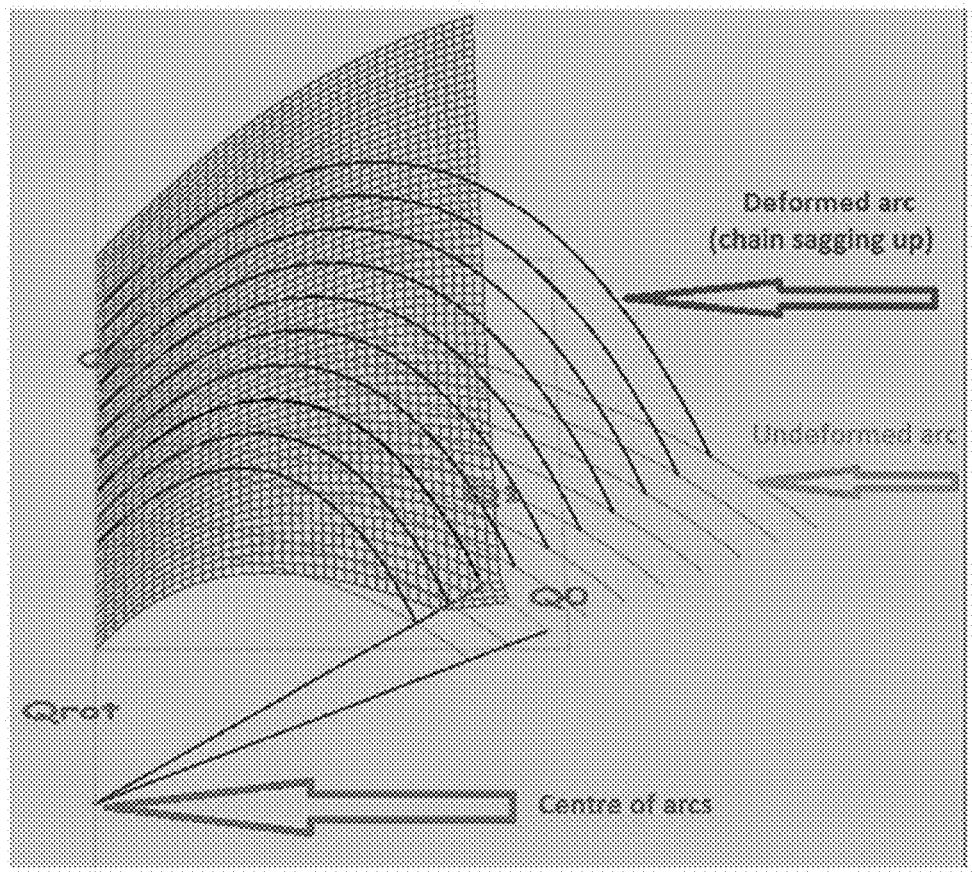
Figure 11:
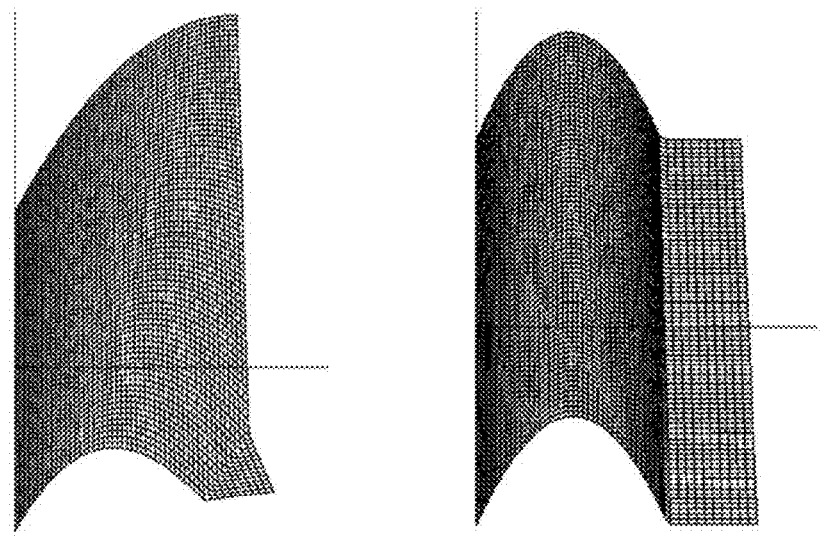
FIG. 11 is a diagram illustrating the result of modifying the coordinates by utilizing the dimensional coordinates according to an embodiment of the present invention.

FIGS. 9 and 10 illustrate the dimensional coordinates to explain the single finger mode, and FIG. 11 is a diagram illustrating the result of modifying the coordinates by utilizing the dimensional coordinates.

Referring to FIGS. 9 and 10, the above-described page shape is expressed in the dimensional coordinates.

The mathematical model is represented by $$\text{Mesh}=\{\vec{p}_{ij}\}, 0 \le i < N_x, 0 \le j < N_y,$$
$$\vec{p}_{ij}=(x_{ij}, y_{ij}, z_{ij}), x_{ij}, y_{ij}, z_{ij} \in R,$$

where $N_x$ and $N_y$—mesh size in vertexes. The size of the mesh cell is L×L, and the mesh size is $L_x \times L_y$.

$q_0$—finger starting position;
$q_1$—finger current position;
$q_{rot}$—center of arc ($|q_{rot}q_0|=|q_{rot}q_1|$);
$p_{ij}$—mesh vertex.

The main principles and the basis of the model are as follows. Deformation can be represented as the paper compression caused by the finger movement by the arc from the starting position $q_0$ to its current position $q_1$. The center of the arc is situated on the OX axis. Compressed lines of any described arc on the paper behave like a chain "sagging up," as can be seen in FIG. 7. All points projections to OXY lie on the un-deformed arc.

Regarding behaving like a chain, the deformed arc on the axis situated on the un-deformed arc is represented by the following Equations (1) and (2):

$$z(t) = H - B \cdot \left(ch\left(\frac{t-t_A}{B}\right) - 1\right) \approx H - \frac{(t-t_A)^2}{B} = H - A(t-t_A)^2 = \hbar(t). \quad (1)$$

Parameters A, H, $t_A$ are determined by the following conditions of Equation (2):

$$\hbar(0) = H - A \cdot t_A^2 =; \quad (2)$$
$$\hbar(t_1) = H - A \cdot (t_1 - t_A)^2 = 0;$$
$$\int_0^{t_1} \sqrt{1 + \left(\frac{d\hbar}{dt}\right)^2} \, dt = t_0,$$

where $t_0 = |q_{rot}q_0| \cdot \alpha_0,$ $t_1 = |q_{rot}q_0| \cdot \alpha_1.$

When simulating the model deformation, put the movement on the cylindrical coordinate system, as represented by Equation (3):

$(x_{ij}, y_{ij}, z_{ij}) \mapsto (r_{ij}, \alpha_{ij}, z_{ij})$. The vertex $\vec{p}_{ij}=(r_{ij}, \alpha_{ij}, 0)$ after the deformation goes to $\vec{p}_{ij}'=(r_{ij}', \alpha_{ij}', z_{ij}')$:

$$r_{ij}' = r_{ij}; \qquad (3)$$

$$\alpha_{ij}' = \begin{cases} \alpha_{ij} \cdot \alpha_1/\alpha_0, & \text{if } \alpha_{ij} < \alpha_0; \\ \alpha_{ij} - \alpha_0 + \alpha_1, & \text{if } \alpha_{ij} \geq \alpha_0; \end{cases}$$

$$z_{ij}' = \begin{cases} \hbar(r_{ij}' \cdot \alpha_{ij}'), & \text{if } \alpha_{ij} < \alpha_0; \\ 0, & \text{if } \alpha_{ij} \geq \alpha_0. \end{cases}$$

The resulting shapes are illustrated in FIG. 11. To enhance the results and make them more realistic, three heuristics can be used. First, the "Real shape" heuristic can be used, by adding to the model with a different shape while it is dragging in the same direction from different starting positions, as can be seen in FIG. 6. Second, the "De-rubber" effect can be used, by preventing the model from stretching. Third, the "Smooth" heuristic can be used, by making transition more diffused from the "zero level" to the deformed part of the model (the line of the "zero-front" $\alpha=\alpha_1$, $z=0$).

Figure 12:
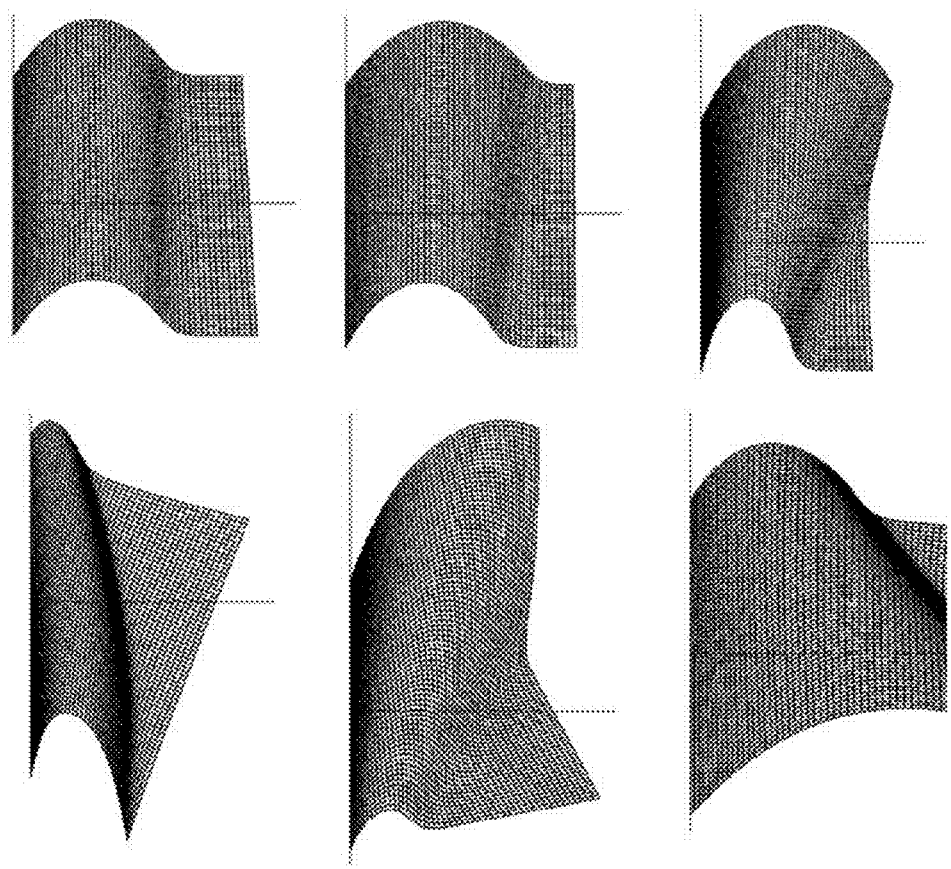
FIG. 12 is a diagram illustrating the displaying more natural page formation by utilizing the Heuristic method, according to an embodiment of the present invention.

As a result, the natural page shape is displayed as illustrated in FIG. 12. The above-described Heuristic is calculated with the following mathematical formulae.

The first procedure may suggest the additional mesh transform: $(x_{ij}, y_{ij}, 0) \mapsto (x_{ij}/\mu(y_{ij}), y_{ij}, 0)$ before the deformation Equation (3) and transform $(x_{ij}, y_{ij}, 0) \mapsto (x_{ij} \cdot \mu(y_{ij}), y_{ij}, 0)$ after the following deformation:

$$\mu(y) = 0.01 \cdot \left(1 + \frac{x_0 - x_1}{L_x}\right) \cdot \frac{y}{L} \cdot \left(1 - \frac{2 \cdot y_0}{L_y}\right),$$

$$\vec{q}_0 = (x_0, y_0, 0),$$

$$\vec{q}_1 = (x_1, y_1, 0).$$

The second heuristic is a contraction of all vertexes to the fixed left side of the page with the original cell size restoration:

$$\vec{p}_{ij}' = \vec{p}_{ij} + \vec{v}_{ij}, \vec{v}_{0j} = 0, \vec{v}_{ij} = \vec{v}_{i-1,j} - (\vec{p}_{ij} - \vec{p}_{i-1,j}) \cdot (1 - L/\|\vec{p}_{ij} - \vec{p}_{i-1,j}\|).$$

The third procedure is an average filter with a square aperture 5×5 applied to vertexes coordinates.

The mathematical model utilized in displaying the page screen in the concave upper side toward the dragging direction if the touch starting point is detected on the second area of the page screen, as illustrated in FIG. 2, is described below.

FIG. 13 is a diagram illustrating the three-dimensional geometry algorithms, implemented with the three-dimensional geometric algorithm that wraps the paper around a cylinder, producing the optimized visual approximation of the page turn. Assuming that the reader moves some corner of the page and defining the cylinder of the radius r and the direction d, whose circular base lies over the XOY plane, found with some heuristic functions of the reader touch point, different page trajectories are obtained by varying these values.

The deformed page is defined by mapping each mesh point onto the cylinder. The page can be modeled as uniform mesh of (N*M) points as it turns. It is necessary to calculate where each point maps to on the cylinder.

Each vertex lies on the XOY plane, when it is immovable. Thus, the main procedure is the wrap page geometry around the cylinder, demonstrated as follows:

($2\pi r$)—the length of circle of radius r;
($\gamma r$)—the length of arc facing $\gamma$ angle.
Based on the picture, r=|OC|;

$$|\overarc{CA'}| = |CA|; |\overarc{CB'}| = |CB|$$

$$\alpha r = |CA|; \beta r = |CB|;$$

$$\alpha = \frac{|CA|}{r}; \beta = \frac{|CB|}{r};$$

If A' or B' needs to be found, rotate the point C around the point A to the angle $\alpha$ or $\beta$, respectively;

Thus, the concave deformation should be taken into account;

$$|CP_1| < |\overarc{CP_1}|;$$

$$|P_1 P_2| < |\overarc{P_1 P_2}|;$$

$$\ldots$$

$$|P_{n-1} P_n| < |\overarc{P_{n-1} P_n}|.$$

Figure 14:
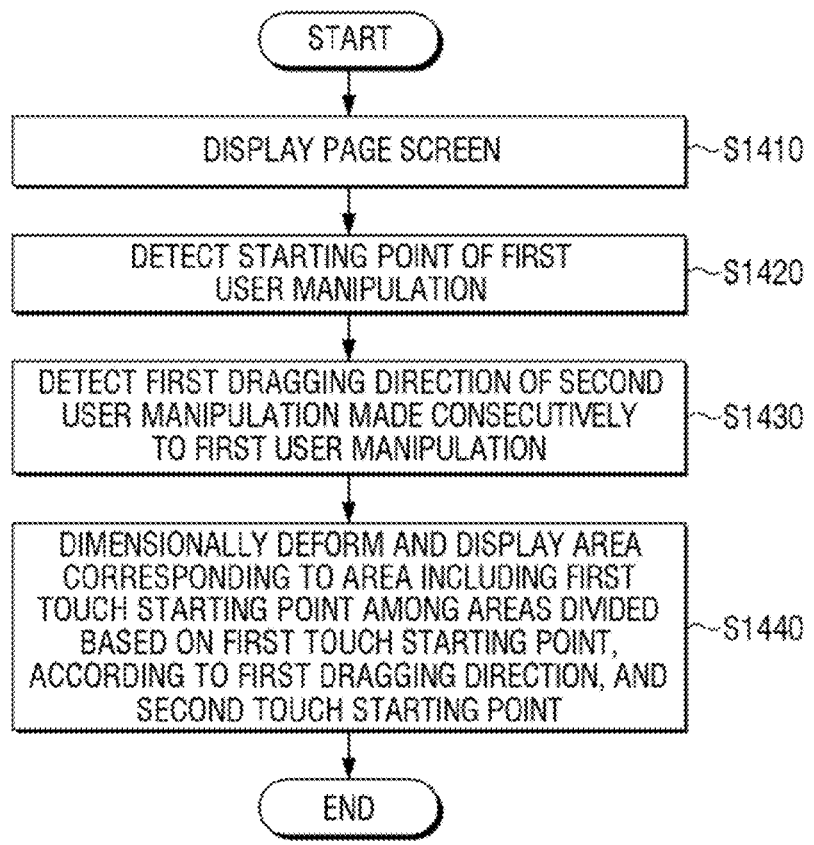
FIG. 14 is a flowchart illustrating displaying the page shape according to an embodiment of the present invention.
Figure 15:
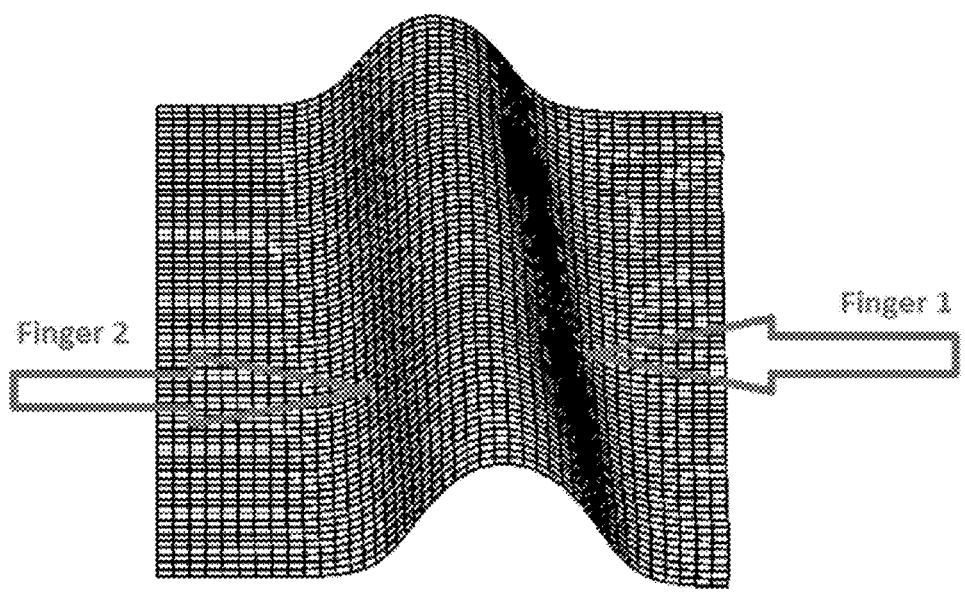
FIG. 15 is a diagram illustrating the page shape according to FIG. 14, according to an embodiment of the present invention.

FIG. 14 is a flowchart illustrating the method of displaying the page shape according to an embodiment, and FIG. 15 is a diagram illustrating the page shape according to FIG. 14.

Referring to FIG. 14, the method of displaying the page shape according to an embodiment includes displaying the page screen, in Step S1410, detecting a first touch starting point and a second touch starting point by the first user manipulation, in Step S1420, detecting a first dragging direction, in Step S1430, and deforming the page screen dimensionally and displaying the deformed page screen, in Step S1440. The operations of Steps S1410, S1420 and S1430 correspond to the operations of Steps S110, S120 and S130, respectively, as described above.

At Step S1440 of deforming the page dimensionally and displaying the deformed page shape, if the first and second starting points are detected, the page screen corresponding to the area including the first touch starting point among the areas divided based on the first starting point, according to the consecutive dragging direction from the first touch, and the second touch starting point is deformed dimensionally and displayed.

When turning the paper book page over, the reader may turn the page over with two fingers. The reader may fix one point with a first finger like a pin on the book, rub the other point with the second finger, and push the page with the second finger toward the first finger fixing point. The upper side of the page is deformed toward the pushing direction in the convex form.

The first finger fixing the page may correspond to the second touch. The second finger pushing the page may correspond to the first touch. The first touch like the second finger pushing the page is detected on one point, such as the starting point, and the dragging is inputted consecutively toward the predetermined direction.

If the direction pushing the page moves away from the second touch starting point, i.e., the fixing first finger, the page may not be deformed. However, if the direction pushing the page goes to the direction indicating that the two fingers come nearer, the page is deformed in the convex upper side. In Step S1440, the above user experience is simulated. When the page is divided based on the second touch starting point (Finger 2) Referring to FIG. 15, if the first touch starting point is detected and the consecutive first dragging direction goes to the second touch starting point, the upper side of the page corresponding to the area including the first touch starting point is deformed in the convex, and the deformed page screen is displayed.

However, the two fingers, i.e., the two touch starting points are positioned on the upper and the lower parts of the page. The method of displaying the page shape if the two touch starting points are positioned on the upper and the lower parts of the page is described below.

Figure 16:
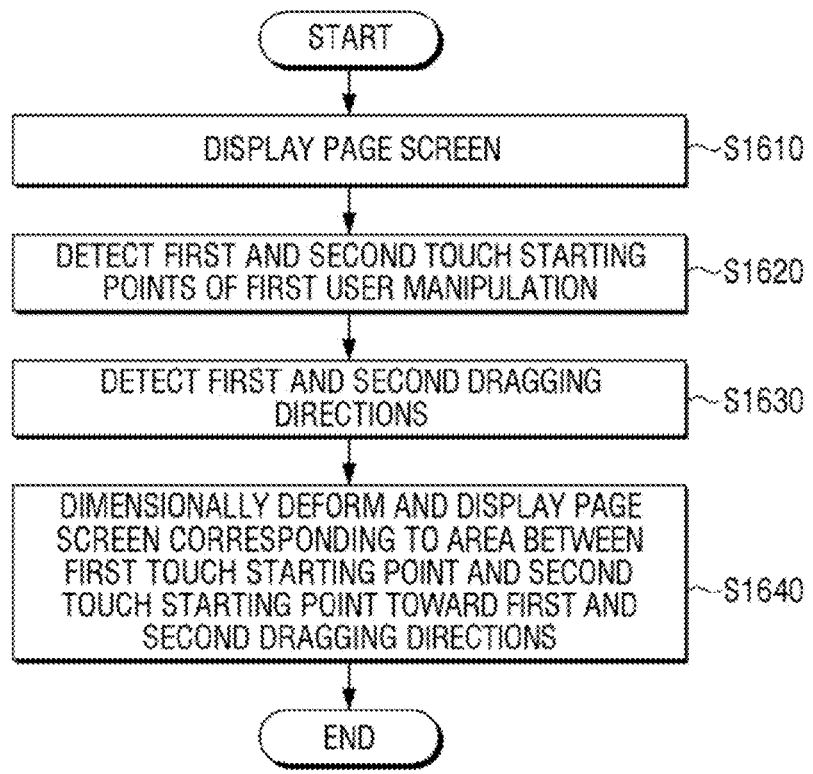
FIG. 16 is a flowchart illustrating displaying the page shape according to an embodiment of the present invention.
Figure 17:
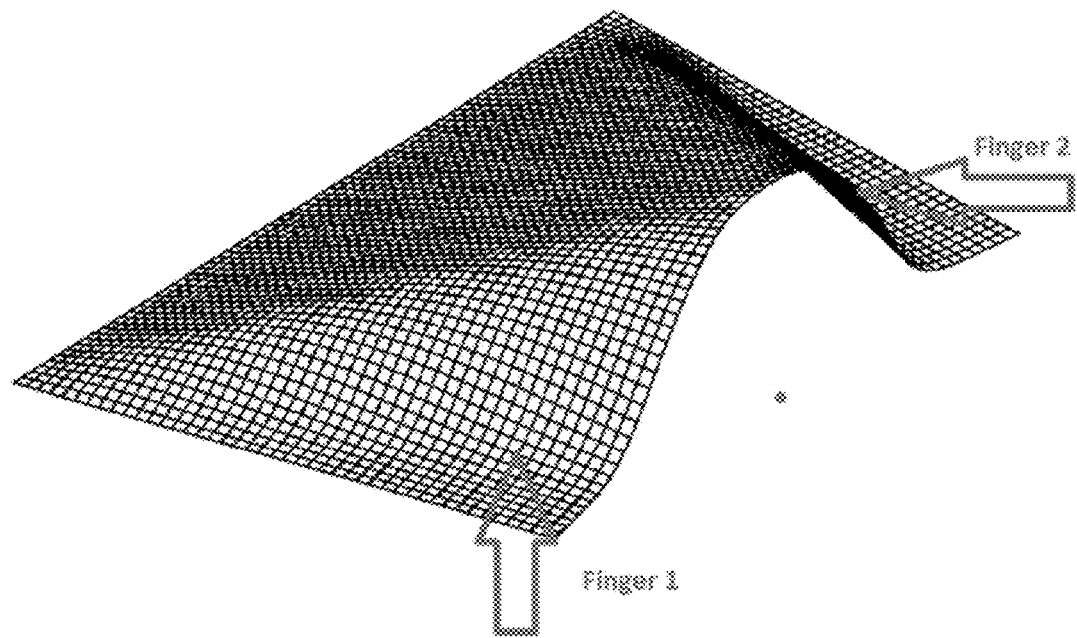
FIG. 17 is a diagram illustrating the page shape according to FIG. 16, according to an embodiment of the present invention.

FIG. 16 is a flowchart illustrating the method of displaying the page shape according to an embodiment, and FIG. 17 is a diagram illustrating the page shape according to FIG. 16.

Referring to FIG. 16, the method of displaying the page shape according to an embodiment includes displaying the page screen, in Step S1610, detecting the first touch starting point and the second touch starting point by the first user manipulation, in Step S1620, detecting the first dragging direction and the second dragging direction, in Step S1630, and deforming the page screen dimensionally and displaying the deformed page screen, in Step S1640. The operations of S1610, S1620, S1630 correspond to the operations of S110, S120, S130, respectively.

In Step S640 of deforming and displaying the page screen, if the first and second touch starting points are detected, the page screen corresponding to the area between the first touch starting point and the second touch starting point toward the first dragging direction made consecutively to the first touch starting point and the second dragging direction made consecutively to the second touch starting point is deformed dimensionally and displayed.

When considering turning the paper book page over, the user may move the two fingers positioned on the upper and the lower of the page when turning the page over with the two fingers. If the user pushes the page with the two fingers moving away from each other, the page is not deformed. However, if the user pushed the page with the two fingers coming near to each other, the page is deformed. While rubbing the different points toward each other with the two fingers, the user may push the page on the direction that the two fingers come nearer. The page is deformed in the pushing direction and is in the concave form.

The two fingers may correspond to the first touch and the second touch, respectively. The movement pushing the page may respond the first dragging and the second dragging, respectively. Like the finger pushing the page, the first touch and the second touch are detected on the different starting points to each other. Consecutively to the predetermined direction, the first dragging and the second dragging are inputted.

Referring to FIG. 17, the page screen corresponding to the area between the first touch starting point (Finger 1) and the second touch starting point (Finger 2) are deformed dimensionally and displayed. Specifically, the page is deformed in the convex upper side and the deformed page screen is displayed.

The mathematical model of the multi finger mode is described below. The deformation of the page shape is displayed as described with reference to the following mathematical model, but embodiments of the present invention are not limited thereto.

Figure 18:
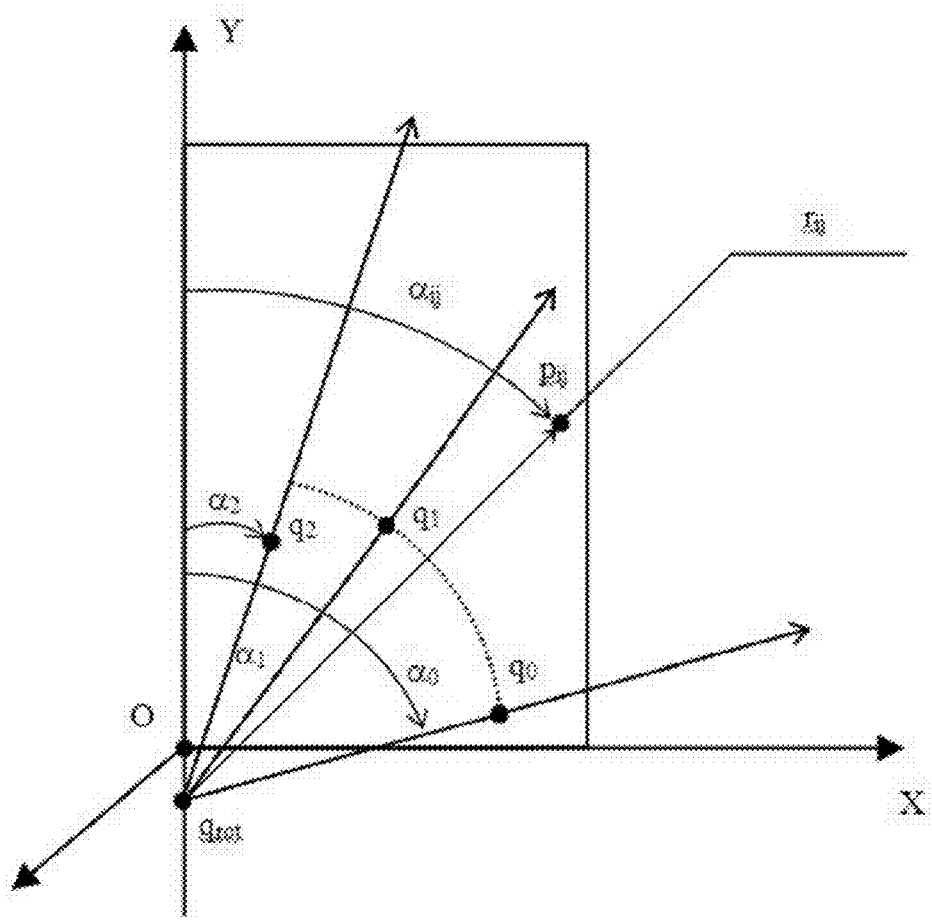
FIGS. 18 and 19 are diagrams illustrating the dimensional coordinates for explaining the multi finger mode, according to an embodiment of the present invention.
Figure 19:
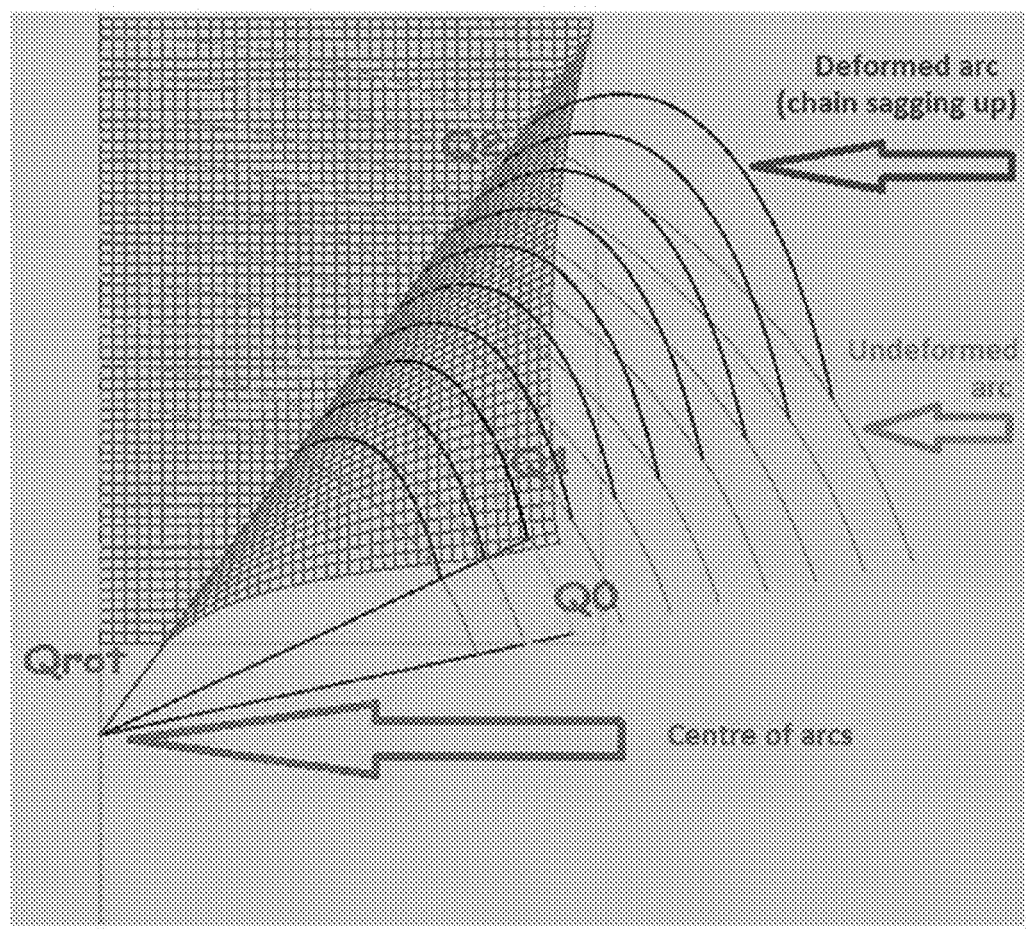
Figure 20:
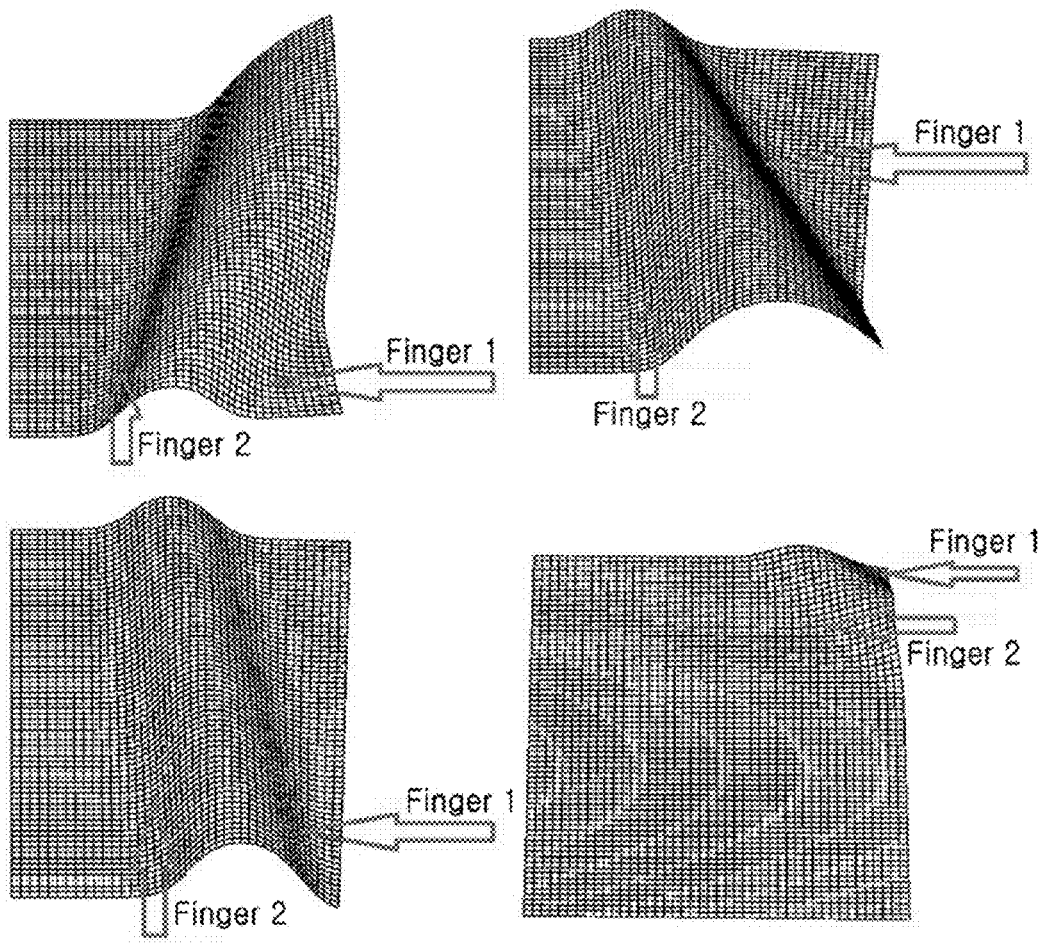
FIG. 20 is a diagram illustrating the page modified by utilizing the dimensional coordinates, according to an embodiment of the present invention.

FIGS. 18 and 19 illustrate the dimensional coordinate to explain the multi finger mode, and FIG. 20 is a diagram illustrating the deformed page by utilizing the dimensional coordinate.

The basic principles of the multi finger mode are the same as in the single finger mode. If the starting model rotates toward the counter-clockwise by $\alpha 2$, the single finger mode can be obtained with the following steps. First, every vertex rotates counter-clockwise by $\alpha 2$. Second, the page deformation of the single finger mode is calculated where the vertexes are zij<=0, zij=0. Third, every vertex rotates clockwise by $\alpha 2$. Fourth, the heuristic methods, as described above, are utilized.

FIG. 20 is a diagram illustrating the results processed by the following procedures.

The two fingers, i.e., the two touch starting points positioned on the upper and the lower of the page is considered. The above procedures may not be utilized in modeling the page deformation.

Figure 21:
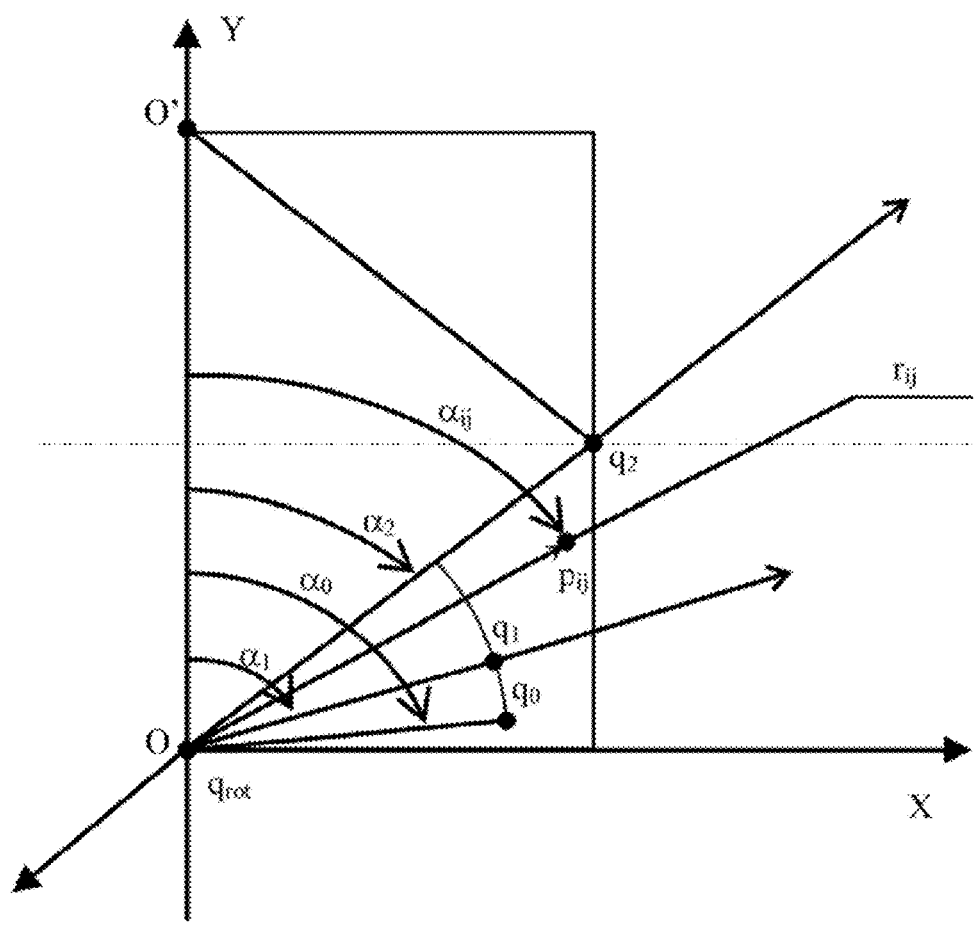
FIGS. 21 and 22 are diagrams illustrating the dimensional coordinates for explaining the multi finger mode if the two fingers put on the upper and lower of the page, according to an embodiment of the present invention.
Figure 22:
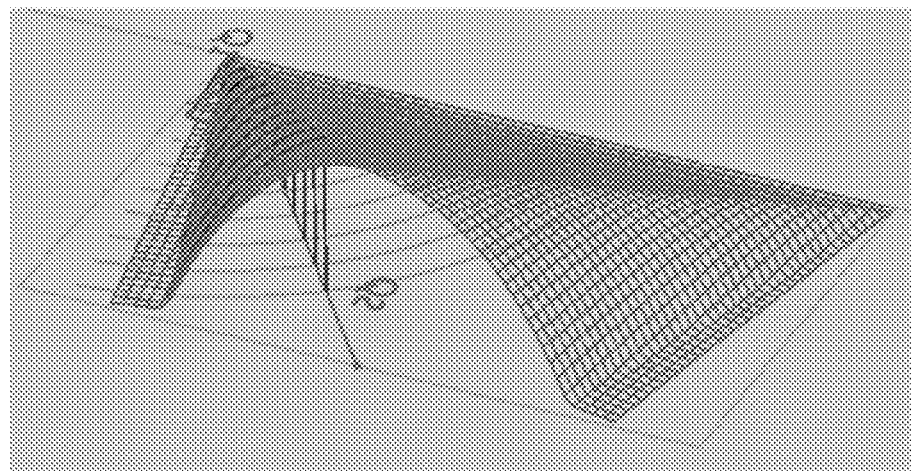

FIGS. 21 and 22 illustrate the dimensional coordinate to explain the multi finger mode if the two fingers position on the upper and the lower of the page.

The model is divided to the two symmetrical parts, i.e., the top and the bottom. Each part includes the two right triangles. In the bottom part, the left deformed triangle rotates counter-clockwise by the determined angle and the right triangle rotates following the arc from q0 to q1 and deforms.

Thus, the deformation model can be obtained on the cylindrical coordinate as represented by Equation (4):

$$r'_{ij} = r_{ij};$$ (4)

$$\alpha'_{ij} = \begin{cases} \alpha_{ij}, & \text{if } \alpha_{ij} \leq \alpha_2; \\ \alpha_2 + \frac{(\alpha_{ij} - \alpha_2) \cdot (\alpha_1 - \alpha_2)}{\alpha_0 - \alpha_2}, & \text{if } \alpha_2 < \alpha_{ij} < \alpha_0; \\ \alpha_{ij} - \alpha_0 + \alpha_1, & \text{if } \alpha_{ij} \geq \alpha_0; \end{cases}$$

$$z'_{ij} = \begin{cases} \max_{\alpha_{ik} \geq \alpha_2} \{z'_{ik}\}, & \text{if } \alpha_{ij} \leq \alpha_2; \\ \hbar\left(r'_{ij} \cdot \left(\frac{(\alpha_{ij} - 2 \cdot \alpha_2 + \alpha_0) \cdot (\alpha_1 - \alpha_2)}{\alpha_0 - \alpha_2}\right)\right), & \text{if } \alpha_2 < \alpha_{ij} < \alpha_0; \\ 0, & \text{if } \alpha_{ij} \geq \alpha_0; \end{cases}$$

where coefficients H, A, $t_A$ for $\hbar$ (t) are calculated from the following conditions:

$$\int_0^{2 \cdot r'_{ij}(\alpha'_1 - \alpha'_2)} \sqrt{1 + \left(\frac{d\hbar}{dt}\right)^2} \, dt = 2 \cdot r'_{ij}(\alpha'_0 - \alpha'_2);$$

$$\hbar(0) = 0;$$

$$\hbar(2 \cdot r_{ij}(\alpha'_1 - \alpha'_2)) = 0.$$

The method of displaying the deformation of the page according to the position of the lifting touch in the single finger mode is described below.

Figure 23:
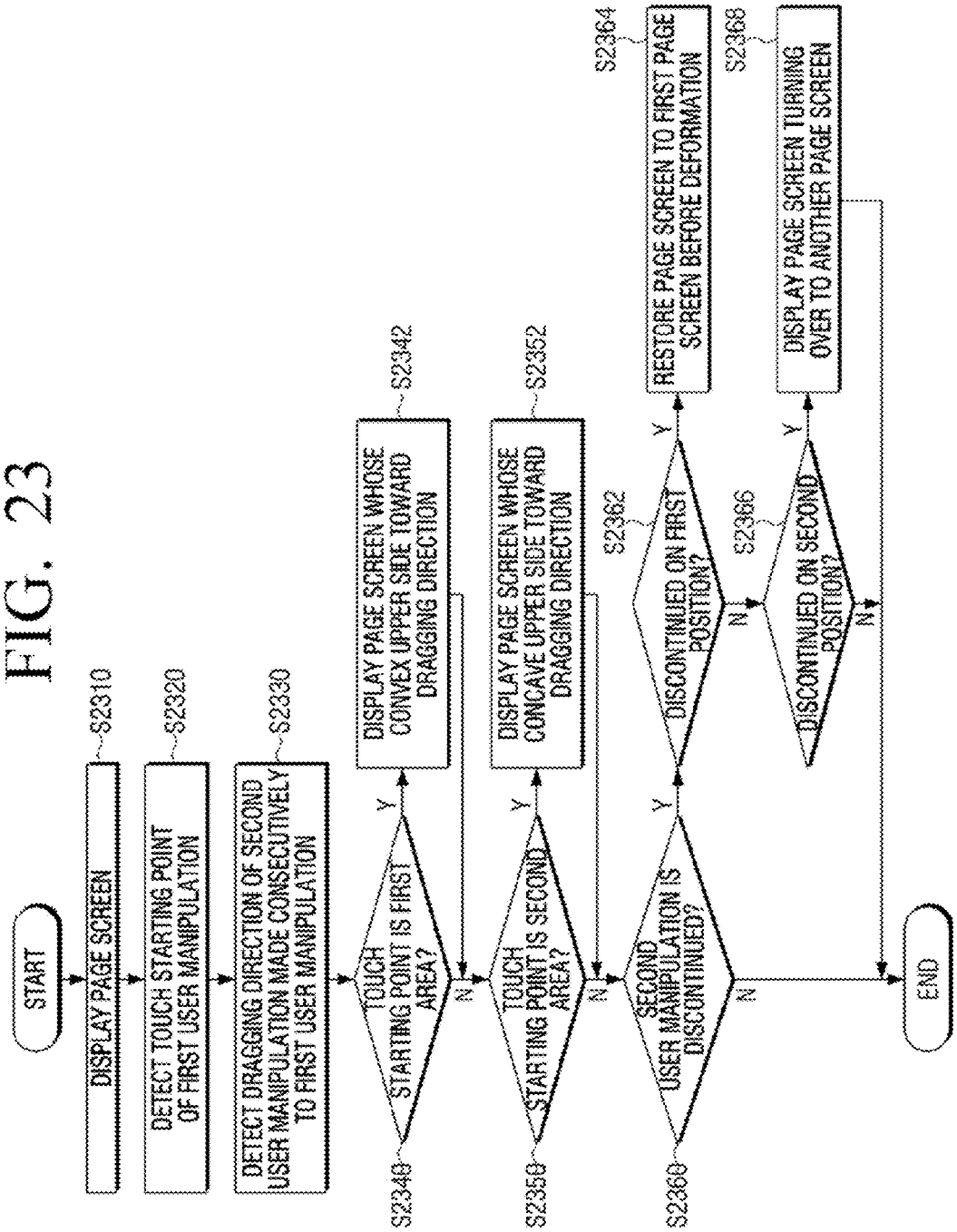
FIG. 23 is a flowchart illustrating a method of displaying the page shape according to an embodiment of the present invention.

FIG. 23 is a flowchart illustrating the method of displaying the page shape according to an embodiment.

Referring to FIG. 23, the method of displaying the page shape includes displaying the page screen, in Step S2310, detecting the starting point by the first user manipulation, in Step S2320, and detecting the dragging direction by the second user manipulation, in Step S2330. The operations of Steps S2310, S2320 and S2330 are the same as the operations of Steps S110, S120 and S130.

The deforming the page screen dimensionally and displaying the deformed page shape is further included.

If the touch starting point is detected in the first area of the page screen, in Step S2340-Y, the page screen having the convex upper side toward the dragging direction is displayed, in Step S2342.

If the touch starting point is detected in the second area of the page screen, in Step S2350-Y, the page screen having the concave upper side toward the dragging direction is displayed, in Step S2352.

If the second user manipulation is discontinued, in Step S2360-Y, the page screen is restored to be the first screen before the deformation according to the position to discontinue the second user manipulation, in Step S2362-Y, S2364, or the page screen is displayed to turn over to another page, in Step S2362-N, S2366-Y, S2368.

Specifically, if the second user manipulation is discontinued on the first position, in Step S2362-Y, the page screen is restored to the first screen. If the second user manipulation is discontinued on the second position, in Step S2362-N, S2366-Y, the page screen is displayed to turn over to another page screen, in Step S2368.

The method of displaying the page deformation according to the position of the lifting touch on the multi finger mode is described below.

Figure 24:
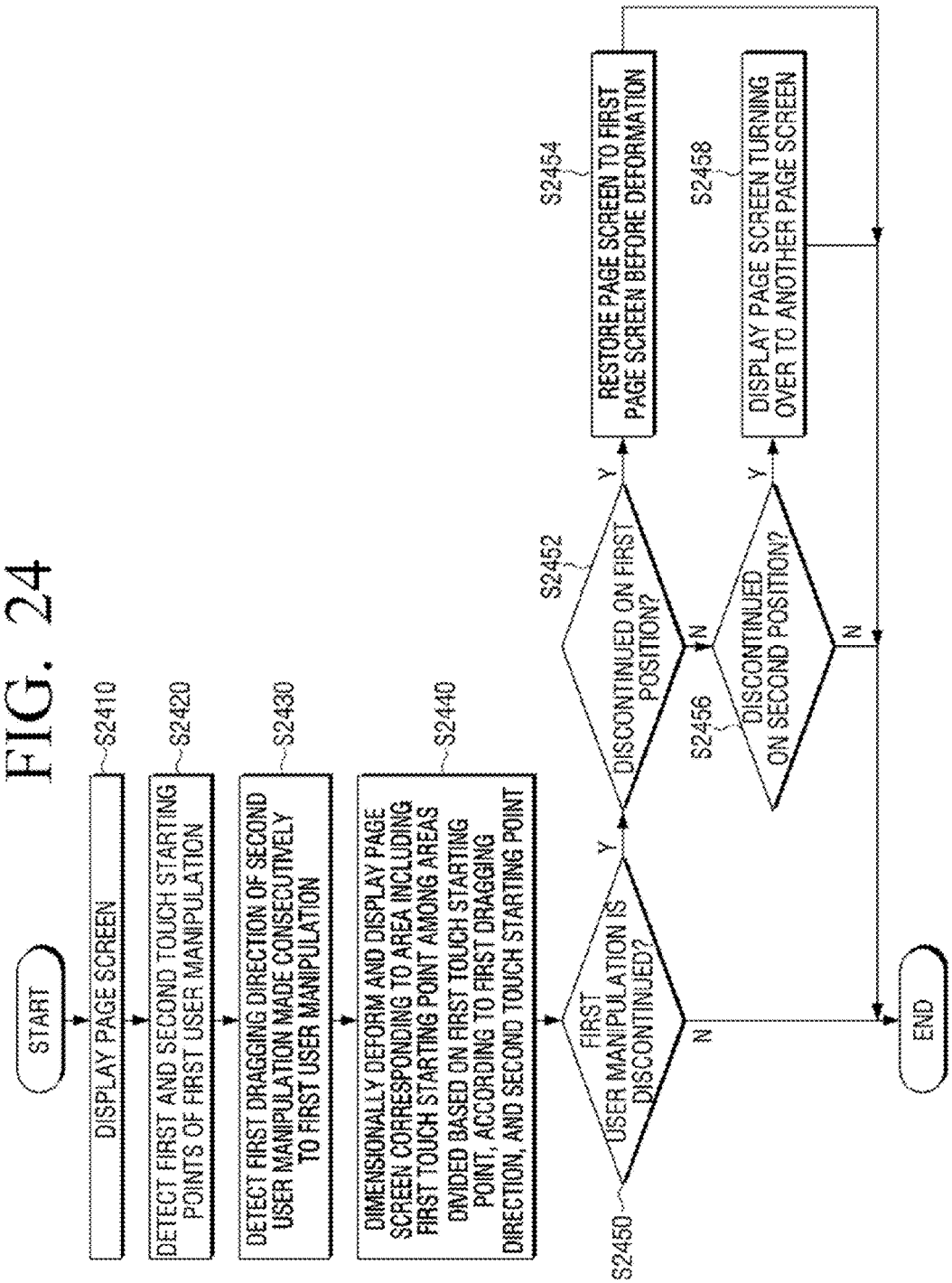
FIG. 24 is a flowchart illustrating a method of displaying the page shape according to an embodiment of the present invention.

FIG. 24 is a flowchart illustrating the method of displaying the page shape according to an embodiment.

Referring to FIG. 24, the method of displaying the page shape according to an embodiment includes displaying the page screen, in Step S2410, detecting the starting points of the first and second touches by the first user manipulation, in Step S2420, and detecting the first dragging direction by the second user manipulation, in Step S2430. The operations of Steps S2410, S2420 and S2430 correspond to the previously described operations of Steps S110, S120 and S130.

Further, the method of displaying the page shape may further include operation S2440 of dimensionally deforming the page screen corresponding to the area where the first touch starting point positions among the areas divided based on the first touch starting point, consecutively according to the first dragging direction from the first touch, and the second touch starting point. The operation, in Step S2440 corresponds to previously described operation in Step S1440.

The method of displaying the page shape may further include the operations of Steps S2452-Y and S2454 of restoring the page screen to the first screen before the deformation according to the position of the lifting of the first user manipulation, or the operations of Steps S2452-N, S2456-Y and S2458 of displaying the page screen to turn over to another page screen, if the first user manipulation regarding the first touch starting point is discontinued, in Step S2450-Y.

Specifically, if the first user manipulation is discontinued, in Step S2450-Y, and the lifting off is implemented on the first position, in Step S2452-Y, the page screen is restored to the first screen before the deformation, in Step S2454. If the first user manipulation is discontinued on the second position, in Step S2456-Y, the page screen is displayed to turn over to another page screen, in Step S2458.

The mathematical model of the page in the animation situation is described below. Even though the mathematical model is utilized to display the page shape, the embodiment may not be limited thereto.

Figure 25:
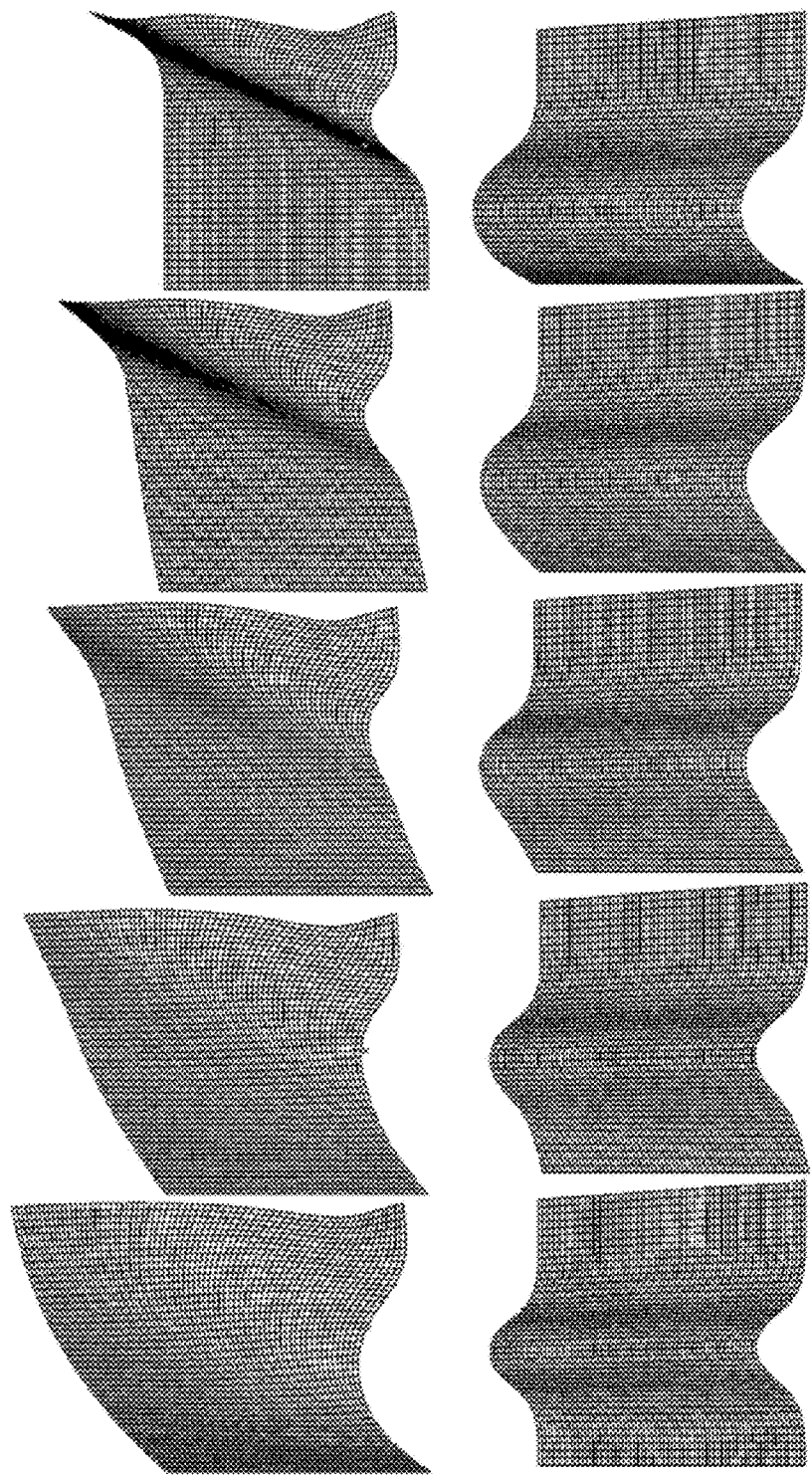
FIG. 25 is a diagram illustrating a page movement on the switch mode according to an embodiment of the present invention.

FIG. 25 is a diagram illustrating the page movement because of the switch mode effect according to an embodiment.

The switch mode effect refers to displaying the consecutive page shape transiting from the single finger mode to the multi finger mode, or displaying the consecutive page shape transiting from the multi finger mode to the single finger mode.

The animation effect may perform the modeling the transition from the single finger mode to the multi finger mode. Based on the animation effect, the linear combination of the starting state and the finishing state are calculated.

First, transit the model from state 1 (for instance, the multi finger mode) to single finger mode. Calculate the starting state, $Mesh^{(0)}=\{\vec{p}_{ij}^{(0)}\}$, where the current state is considered in practice, and the finishing state, i.e., the target state, $Mesh^{(1)}=\{\vec{p}_{ij}^{(1)}\}$.

Thus, the animation effect consists of the frames, $Mesh^{(T)}=\{\vec{p}_{ij}^{(T)}\}$ where T goes from 0 (the starting position) to 1 (the finishing position) with several steps of $\Delta T$. The algorithm for calculating $Mesh^{(T)}=\{\vec{p}_{ij}^{(T)}\}$ is as follows. First, the linear combination of the starting and finishing positions is calculated, represented as Equation (5):

$$Mesh^{(T)}=Mesh^{(1)}+_T Mesh^{(2)}$$

$$Mesh^{(1)}+_\lambda Mesh^{(2)}=\{\vec{p}_{ij}=(1-\lambda)\cdot\vec{p}_{ij}^{(1)}+\lambda\cdot\vec{p}_{ij}^{(2)}\},\forall i=\overline{0,N_x-1},j=\overline{0,N_y-1}$$

where is $\lambda$–sum operation ($\lambda\in[0,1]$), represented as follows:

$$Mesh^{(1)}+_\lambda Mesh^{(2)}=\{\vec{p}_{ij}=(1-\lambda)\cdot\vec{p}_{ij}^{(1)}+\lambda\cdot\vec{p}_{ij}^{(2)}\},\forall i=\overline{0,N_x-1},j=\overline{0,N_y-1}. \quad (5)$$

Then, the "De-rubber" heuristic is applied, followed by applying the "Smooth" heuristic.

FIG. 25 is a diagram illustrating the consecutively transiting page shape when converting the mode by the switch mode effect.

The mathematical model because of the page drop down effect is described below. Even though the mathematical model is utilized to display the page shape, embodiments of the present invention are not limited thereto.

Figure 26:
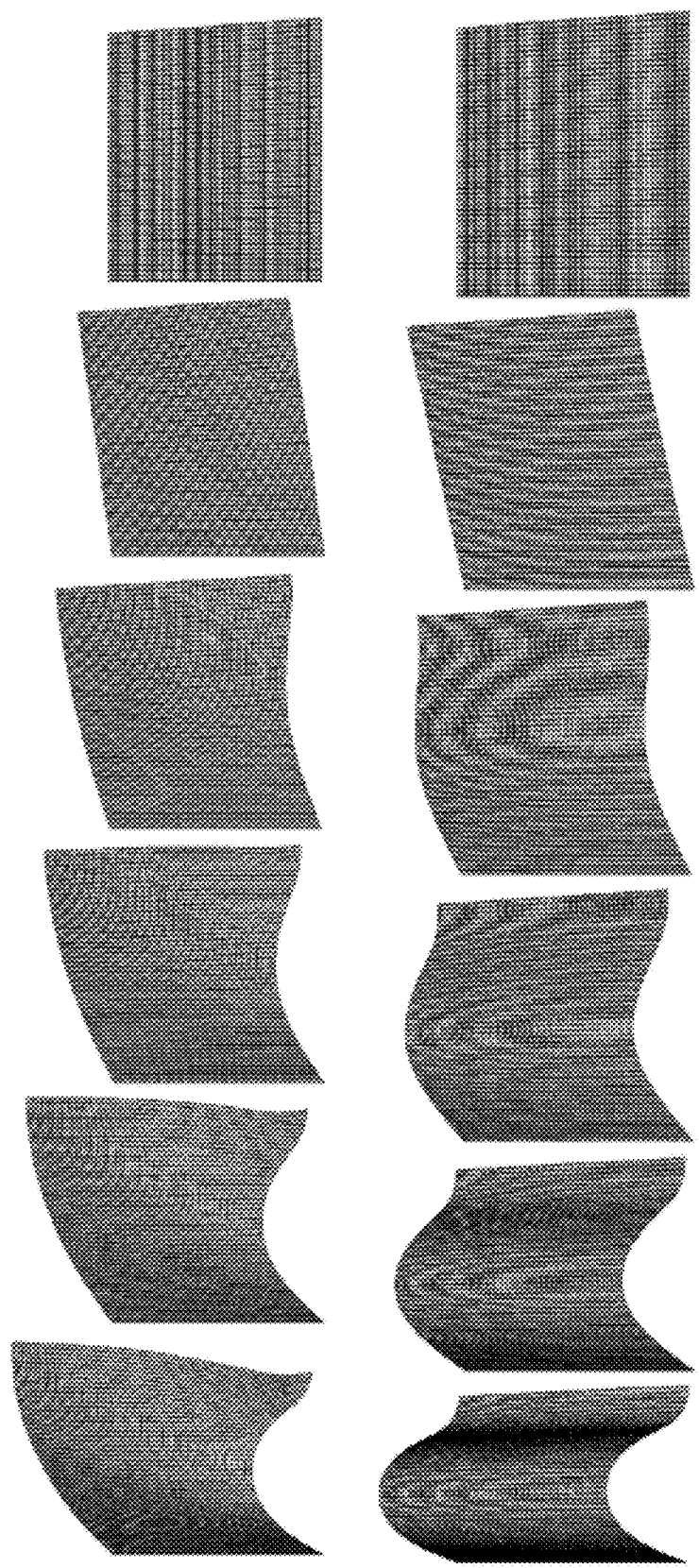
FIG. 26 is a diagram illustrating a page movement by dropping down according to an embodiment of the present invention.

FIG. 26 is a diagram illustrating the page movement by the drop down effect according to an embodiment.

The drop down effect refers to displaying the consecutive page shape if the page deformed by the determined angle is unfolded and the angle from the horizontal side is 0. When displaying the page shape, if the second user manipulation is discontinued, the consecutive page shape corresponding to the movement of restoring the page screen to the first page screen before the deformation according to the position of discontinuing the second user manipulation.

Further, when displaying the page shape, if the first touch starting point and the second touch starting point are found, and if the first user manipulation of the first touch starting point is discontinued, in Step S2350-Y, the consecutive page shape corresponding to the movement restoring the page screen to the first page screen before the deformation (in Steps S2352-Y and S2354) is displayed.

Further, when displaying the page shape, if the page screen corresponding to the area between the first touch starting point and the second touch starting point according to the first dragging direction made consecutively to the first touch and the second dragging direction made consecutively to the second touch is deformed dimensionally and displayed, in Step S1540, and if inputting the first touch and the second touch stops, the consecutive page shape corresponding to the movement of restoring the page screen to the first page screen may be displayed.

The animation effect is modeled by the transition from deformed model to the starting position. The effect can be divided in two stages. The first stage occupies 80% of the time and is modeled by the mesh straightening to the plane Rot ($\alpha_{start}$) obtained by Equation (6), rotating the mesh in the starting position counterclockwise around OY by angle, as follows:

$$\alpha_{start} = \frac{\pi}{2} \cdot \left(\frac{x_0 - x_1}{L_x}\right)^2, \quad (6)$$

where $$Rot(\alpha) = \{\vec{p}_{ij} = (x_{ij}, y_{ij}, z_{ij}) = (i \cdot L \cdot \cos(\alpha), j \cdot L, i \cdot L \cdot \sin(\alpha))\}$$

The second stage is gradually dropping to the page starting position. Thus, the mesh at the time point T is as represented in Equation (7):

$$Mesh^{(T)} = \begin{cases} Mesh^{(0)} + \frac{6}{5}T \cdot Rot(\alpha_{start}), & \text{if } T \in [0, 0.8); \\ Rot(\alpha_{start}) \cdot (1.8 - 5 \cdot T)), & \text{if } T \in [0.8, 1]. \end{cases} \quad (7)$$

FIG. 26 is a diagram illustrating consecutively transforming page shape by the drop down effect if the page drops.

The mathematical model of the page turn effect is described below. Even though the mathematical model is utilized to display the page shape, the embodiment is not limited thereto.

Figure 27:
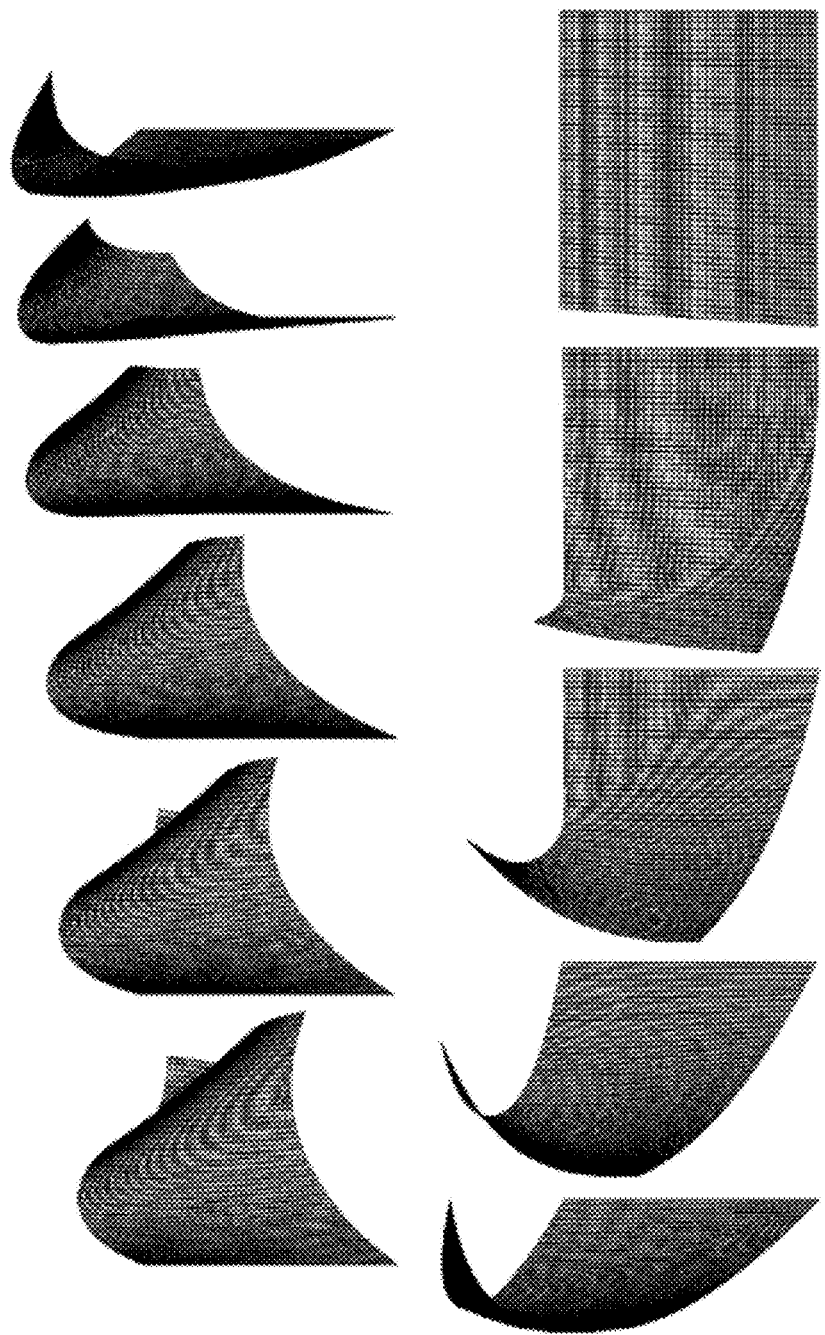
FIGS. 27 to 29 are diagrams illustrating a page movement by turning over according to an embodiment of the present invention.
Figure 28:
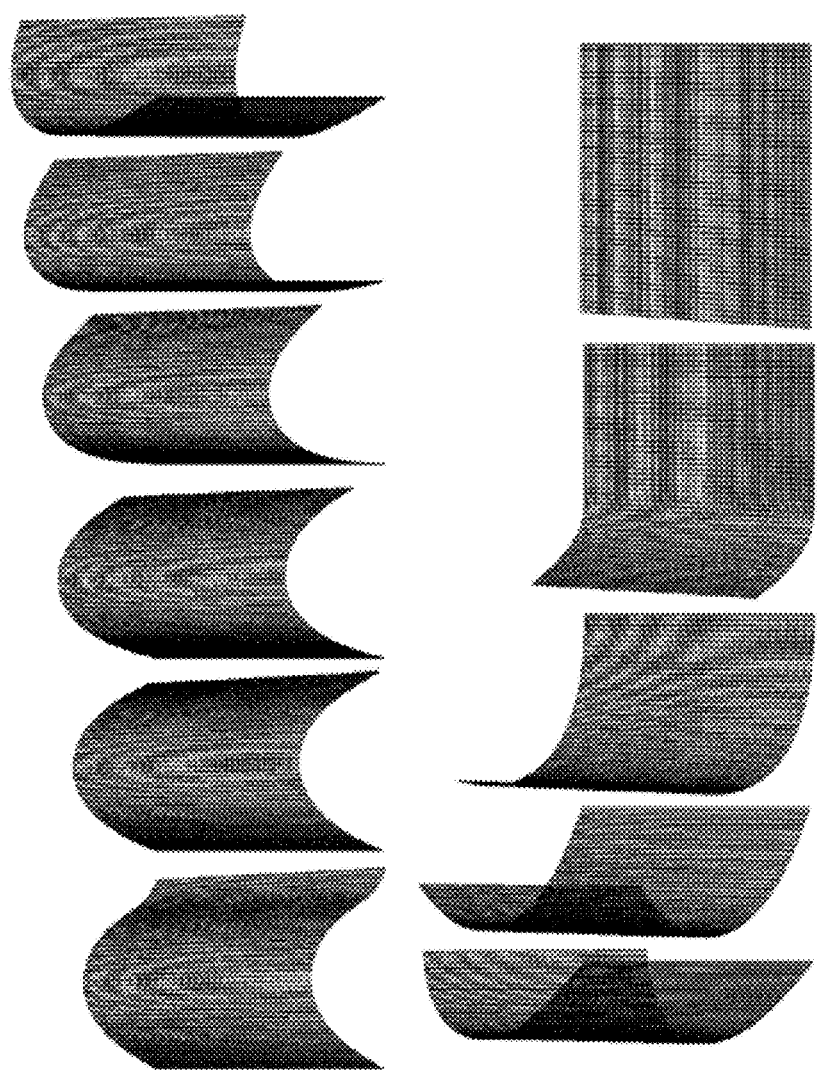
Figure 29:
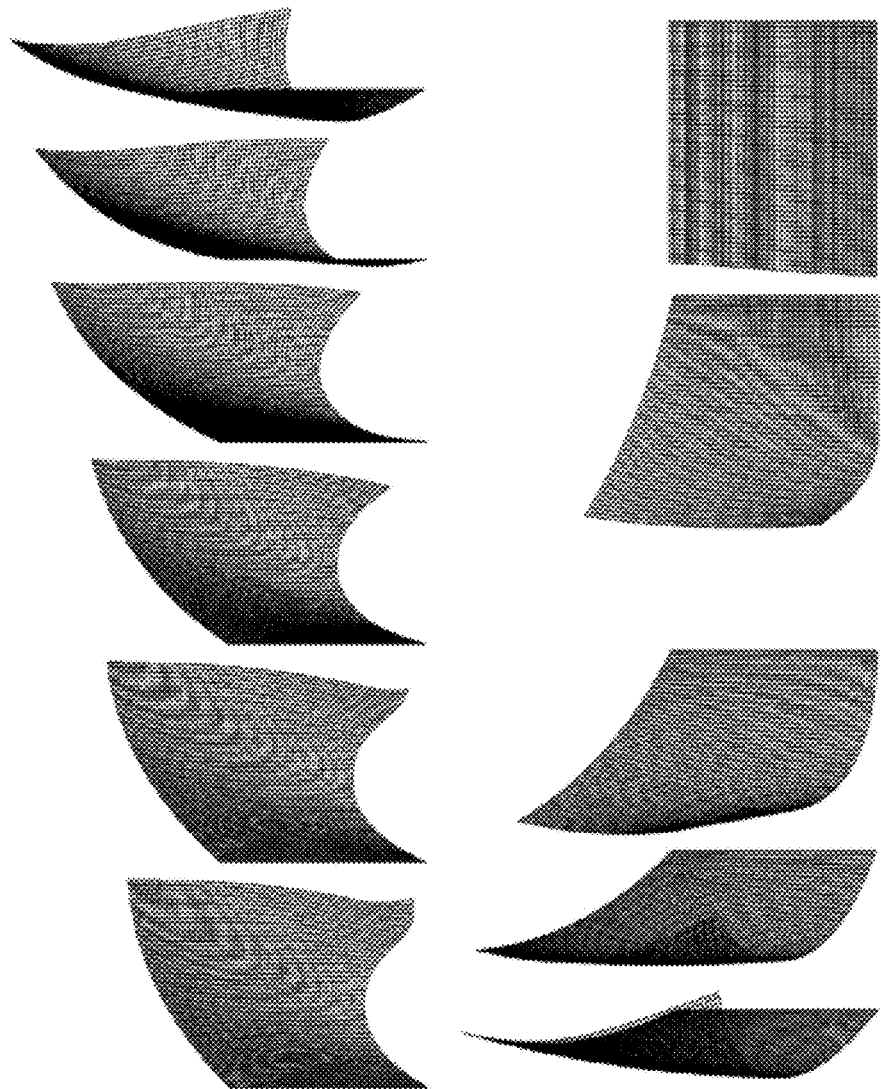

FIGS. 27, 28 and 29 illustrate the page movement by the page turn effect according to an embodiment.

In the above embodiment, if the second user manipulation is discontinued, the consecutive page shape corresponding to the movement of turning the page screen to another page screen according to the position of the lifting of the second user manipulation is displayed.

Further, if the first touch starting point and the second touch starting point are found, and if the first user manipulation of the first touch starting point is discontinued (S2350-Y), the consecutive page shape corresponding to the movement of turning the page screen to another page screen according to the lifting-off position is displayed.

The animation effect is modeled by the transition from the single finger mode (case 1) to the finishing position, which is completely turned. Based on the effect realization, the movement of the key-points ($\vec{q}_0$ and $\vec{q}_1$) is put while simultaneously rotating the deformed model around the axis OY. Point $\vec{q}_0$ moves from the starting position $\vec{q}_0(0)$ to the finishing position, $$\vec{q}_0(1) = \left(\frac{3}{2}L_x, y_0(0), 0\right),$$

and $\vec{q}_1$ moves from its starting position $\vec{q}_1(0)$ to $\vec{q}_0(T)$. Thus, the calculation of the mesh vertexes coordinates at moment T, normally consists of calculating and rotating, as follows. The deformed mesh with the key-points is calculated based on Equation (8):

$$\vec{q}_0(T) = \vec{q}_0(0) + T \cdot (\vec{q}_0(1) - \vec{q}_0(0)); \quad (8)$$

-continued
$$\vec{q}_1(T) = \vec{q}_1(0) + T^4 \cdot (\vec{q}_0(T) - \vec{q}_1(0));$$

$$\vec{q}_0(1) = \left(\frac{3}{2}L_x, y_0(0), 0\right).$$

Then the deformed mesh is rotated based on Equation (8) around the axis OY counterclockwise by angle $\alpha(T)=\pi \cdot T^2$.

FIGS. 27, 28 and 29 illustrate the consecutively transforming page shape by the page turn effect if the page turns over. As described herein, $\Delta T=0.1$.

Figure 30:
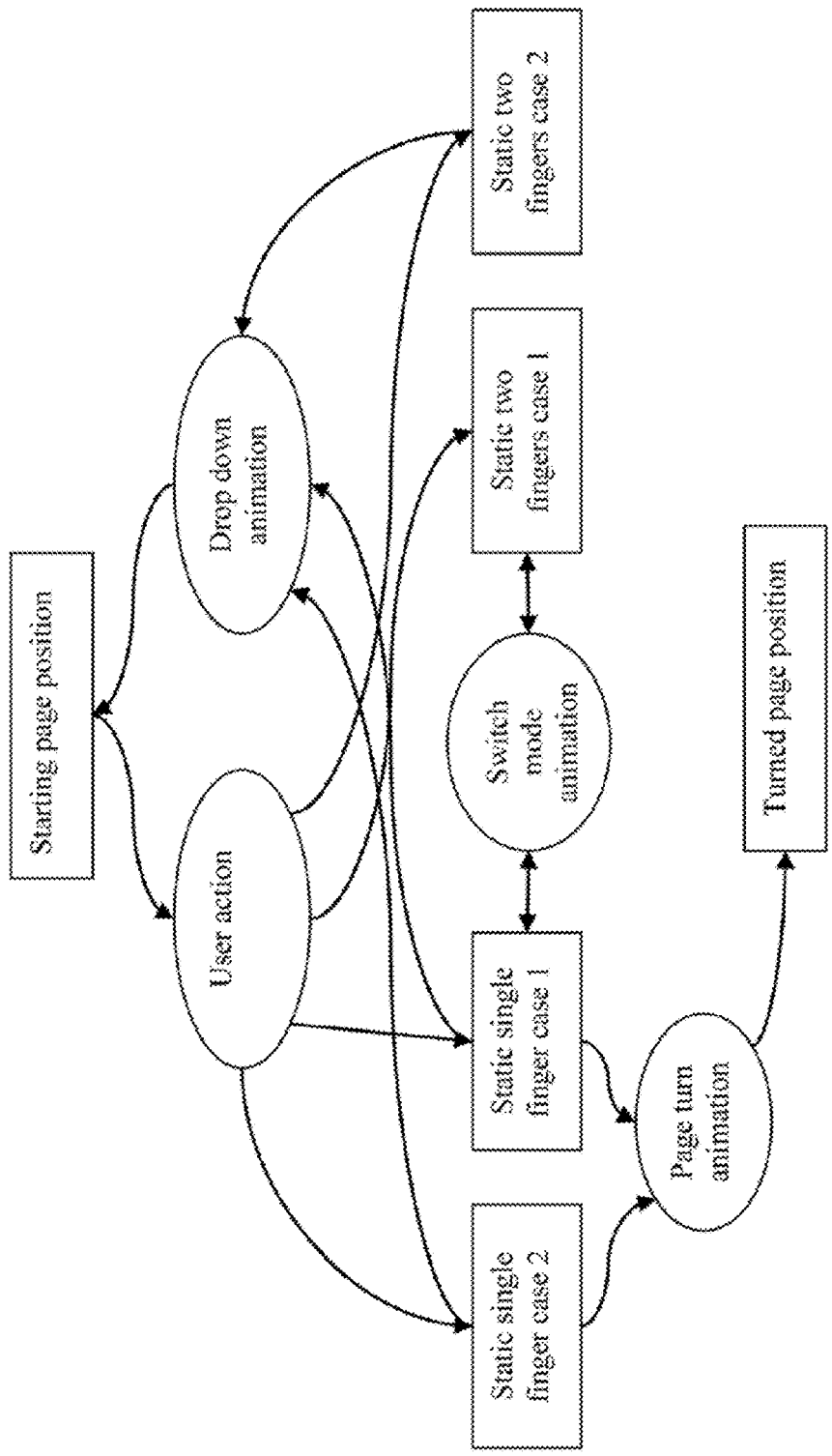
FIG. 30 is a diagram capturing the above movements if the page is displayed from the starting point to the ending shape according to an embodiment of the present invention.

FIG. 30 is a diagram illustrating classifying the above movement according to the situation if the page is displayed from the starting position to the finishing position.

The program implementing the method according to the embodiments described above is recorded and utilized in various types of recording mediums.

Specifically, the code implementing the above method can be stored in the various types of the recording medium that can be read on the terminal such as Random Access Memory (RAM), flash memory, Read Only Memory (ROM), Erasable Programmable ROM (EPROM), Electronically Erasable and Programmable ROM (EEPROM), registers, hard disk, removable disk, memory card, USB memory, and CD-ROM.

Figure 31:
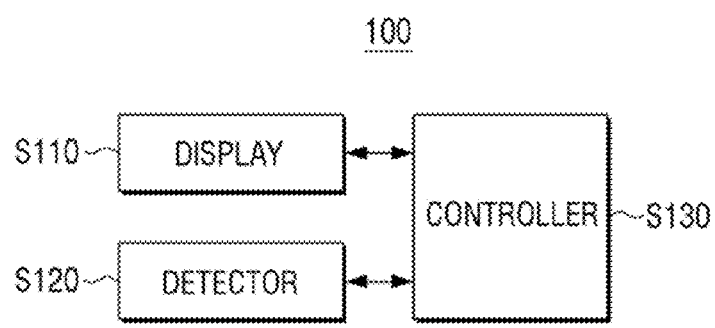
FIG. 31 is a block diagram illustrating a display apparatus according to various embodiments.

FIG. 31 is a block diagram illustrating a display apparatus 100 according to an embodiment of the present invention. Referring to FIG. 31, the display apparatus 100 according to an embodiment of the present invention includes a display 110, a detector 120, and a controller 130.

The display 110 is constituted to display the page movement, and implemented as at least one of a Liquid Crystal Display Panel, a Plasma Display Panel, an Organic Light Emitting Diodes (OLED), a Vacuum Fluorescent Display (VFD), a Field Emission Display (FED), and an Electro Luminescence Display (ELD). Further, the display 100 includes a touch screen that can receive the touch input of the user.

The detector 120 detects at least one touch starting point by the first user manipulation and at least one dragging direction by the second user manipulation consecutive from the first user manipulation on the page screen.

The controller 130 controls the deforming the page screen dimensionally based on the detected touch starting point and the detected dragging direction and the displaying the deformed page screen.

According to an embodiment of the present invention, if the touch starting point is detected on the first area of the page screen, the controller 130 may display the deformed page screen including the convex upper side toward the dragging direction. If the touch starting point is detected on the second area of the page screen, the controller 130 may display the deformed page screen including the concave upper side toward the dragging direction.

According to an embodiment of the present invention, if the touch starting point is positioned on the merging area except for the center of the first area on the page screen, the controller 130 may display the deformed page screen where the curvature of radius of the page cross section increases from the upper to the lower of the page screen.

According to an embodiment of the present invention, if the second user manipulation is discontinued, the controller 130 may restore the page screen to the first page screen before the deformation or may display the page screen to turn over to another page screen, according to the position of the lifting of the second user manipulation.

According to an embodiment of the present invention, if the first and second touch starting points are detected, the controller 130 may dimensionally deform and display the page screen corresponding to the area including the first touch starting point among the areas divided based on the first touch starting point, according to the first dragging direction made consecutively to the first touch starting point, and the second touch starting point.

According to an embodiment of the present invention, if the first user manipulation of the first touch starting point is discontinued, the controller 130 may restore the page screen to the first page screen before the deformation or the page screen to turn over to another page screen according to the position of discontinuing the first user manipulation.

According to an embodiment of the present invention, if the first and second touch starting points are detected, the controller 130 may dimensionally deform and display the page screen corresponding to the area between the first touch starting point and the second touch starting point toward the first dragging direction made consecutively to the first touch starting point and the second dragging direction made consecutively to the second touch starting point.

According to an embodiment of the present invention, the first dragging direction and the second dragging direction are orthogonal to the page screen and may come nearer.

The display apparatus includes an apparatus displaying the page shape of the electronic book.

Although various embodiments of the present invention have been described in detail herein, it will be apparent to those of ordinary skill in the art that variations and modifications in form and detail may be made without departing from the spirit and scope of the present invention, as defined by the appended claims.

What is claimed is:

1. A method for displaying a page shape, the method comprising the steps of:
    displaying a page screen;
    detecting a first touch starting point by a first user-manipulation on the page screen;
    detecting a first dragging direction by a second user-manipulation made consecutively to the first user-manipulation;
    dimensionally deforming the page screen based on the first touch starting point and the first dragging direction; and
    displaying a deformed page screen, resulting from dimensionally deforming the page screen,
    wherein displaying the deformed page screen comprises:
    displaying the page screen where an upper side of the page screen is convexed according to the first dragging direction, if the first touch starting point is detected on a first area of the page screen; and
    displaying the page screen where the upper side of the page screen is concaved according to the first dragging direction, if the first touch starting point is detected on a second area.

2. The method of claim 1, further comprising:
    if the first touch starting point is positioned on a center of any one of the first and second areas on the page screen, displaying the page screen in a shape that a cross section of the page screen has a predetermined curvature of radius.

3. The method of claim 1, further comprising:
    if the first touch starting point is positioned on an area other than a center of any one of the first and second areas on the page screen, displaying the page screen in a shape that a cross section of the page screen has a curvature of radius increasing from the first touch starting point of the page to the center.

4. The method of claim 1, further comprising:
    if the second user-manipulation is discontinued, restoring the page screen to the first page screen in the form before the deformation, or displaying so that the page screen turns over to another page screen according to the position of discontinuing the second user-manipulation.

5. The method of claim 1, further comprising detecting a second touch starting point on the page screen,
    wherein dimensionally deforming the page screen and displaying the deformed page screen comprises dimensionally deforming the page screen corresponding to an area including the first touch starting point among the areas divided based on the first touch starting point, according to the first dragging direction made consecutively to the first touch, and the second touch starting point, and displaying the deformed page screen.

6. The method of claim 5, wherein, if the first user-manipulation of the first touch starting point is discontinued, restoring the page screen to a form before the deformation, or displaying the page screen in a form of being turned over to another page screen according to the position of discontinuing the first user-manipulation.

7. The method of claim 1, further comprising detecting a second touch starting point on the pages screen,
    wherein dimensionally deforming the page screen and displaying the deformed page screen comprises dimensionally deforming the page screen corresponding to an area between the first touch starting point and the second touch starting point toward the first dragging direction made consecutively to the first touch and a second dragging direction made consecutively to the second touch starting point and displaying the deformed page screen.

8. The method of claim 7, wherein the first and second dragging directions are orthogonal to the page screen and approaching toward each other.

9. The method of claim 1, wherein the page shape is displayed in an electronic book.

10. A display apparatus, comprising:
    a display configured to display a page screen;
    a detector configured to detect a first touch starting point by a first user-manipulation on the page screen and a first dragging direction by a second user-manipulation consecutively made to the first user-manipulation; and
    a controller configured to dimensionally deform the page screen based on the first touch starting point and the first dragging direction and display the deformed page screen, resulting from dimensionally deforming the page screen,
    wherein the controller displays the page screen where an upper side of the page screen is convexed in the first dragging direction, if the first touch starting point is detected on a first area of the page screen, and displays the page screen where the upper side of the page screen is concaved in the dragging direction, if the first touch starting point is detected on a second area of the page screen.

11. The display apparatus of claim 10, wherein, if the first touch starting point is positioned on a center of any one of the first and second areas on the page screen, the controller displays the page screen in a shape that a cross section of the page screen has a predetermined curvature of radius.

12. The display apparatus of claim 10, wherein, if the first touch starting point is positioned on an area other than a center of any one of the first and second areas on the page screen, the controller displays the page screen in a shape that a cross section of the page screen has a curvature of radius increasing from the top to the bottom of the page screen.

13. The display apparatus of claim 10, wherein, if the second user-manipulation is discontinued, the controller restores the page screen to a form before the deformation, or displays the page screen in a form of being turned over to another page screen according to the position of discontinuing the second user-manipulation.

14. The display apparatus of claim 10, wherein the detector detects a second touch starting point, and wherein the controller dimensionally deforms the page screen corresponding to an area including the first touch starting point among the areas divided based on the first touch starting point, according to the first dragging direction from the first touch starting point, and the second touch starting point.

15. The display apparatus of claim 14, wherein, if the first user-manipulation of the first touch starting point is discontinued, the controller restores the page screen to a form before the deformation, or displays the page screen in a form of being turned over to another page screen according to the position of discontinuing the first user-manipulation.

16. The display apparatus of claim 14, wherein the detector detects a second touch starting point, and wherein the controller dimensionally deforms the page screen corresponding to an area between the first touch starting point and the second touch starting point toward the first dragging direction made consecutively to the first touch starting point and the second dragging direction made consecutively to the second touch starting point and displays the deformed page screen.

17. The display apparatus of claim 16, wherein the first and second dragging directions are orthogonal to the page screen and approaching toward each other.

* * * * *